United States Patent [19]

Tsuruoka et al.

[11] Patent Number: 4,970,712
[45] Date of Patent: Nov. 13, 1990

[54] METHOD FOR RECORDING DATA ONTO OPTICAL DATA RECORDING CARDS USING PITS FOR INDICATING THE CENTER LINE POSITIONS OF DATA ARRAYS PROVIDED ON SAID CARDS

[75] Inventors: Yoshiaki Tsuruoka, Funabashi; Yorihiko Sakai, Tokyo; Wataru Kuramochi, Kawagoe, all of Japan

[73] Assignee: Dai Nippon Insatsu Kabushiki Kaisha, Japan

[21] Appl. No.: 361,812

[22] Filed: May 31, 1989

Related U.S. Application Data

[62] Division of Ser. No. 6,560, Dec. 18, 1986, abandoned.

[30] Foreign Application Priority Data

| Apr. 23, 1985 | [JP] | Japan | 60-87181 |
| Apr. 23, 1985 | [JP] | Japan | 60-87182 |
| Apr. 23, 1985 | [JP] | Japan | 60-87183 |
| Apr. 23, 1985 | [JP] | Japan | 60-87184 |
| Dec. 3, 1985 | [JP] | Japan | 60-272296 |
| Dec. 3, 1985 | [JP] | Japan | 60-272297 |
| Dec. 3, 1985 | [JP] | Japan | 60-272298 |
| Dec. 19, 1985 | [JP] | Japan | 60-286561 |

[51] Int. Cl.⁵ .................. G06K 19/06; G11B 7/007
[52] U.S. Cl. .................... 369/109; 235/456; 235/494; 235/487; 369/59; 369/47
[58] Field of Search ............ 235/436, 438, 454, 456, 235/470, 487, 488, 494; 369/275, 46, 54, 58, 109, 47, 48, 59

[56] References Cited

U.S. PATENT DOCUMENTS

| 4,213,040 | 7/1980 | Gokey et al. | 235/454 |
| 4,634,850 | 1/1987 | Pierce et al. | 235/487 |
| 4,652,730 | 3/1987 | Marshall | 235/456 |
| 4,728,783 | 3/1988 | Brass et al. | 235/456 |

FOREIGN PATENT DOCUMENTS

| 55617 | 5/1977 | Japan | 235/449 |
| 8113 | 1/1978 | Japan | 360/31 |
| 54-16 | 1/1979 | Japan | 360/53 |
| 58-727 | 12/1983 | Japan | 360/39 |

OTHER PUBLICATIONS

Electronics, 5/1/75, p. 90.
International Organization for Standardization, 6/1/76, pp. 4, 5.

Primary Examiner—Robert L. Richardson
Assistant Examiner—Robert A. Weinhardt
Attorney, Agent, or Firm—Arnold, White & Durkee

[57] ABSTRACT

A format is provided with special error check pits in order to take countermeasures when readout errors occur. Furthermore, in order to take countermeasures when readout errors occur due to local contamination on the optical data recording card, the data are distributed and then recorded. In order to perform the efficient access to data, required data representing a predetermined address value are also recorded together with the general data. A method is also provided for forming pits by modulating the digital signal and an optical system as well as a signal processing system of a reading device used in connection with the optical data recording cards. The optical data recording cards on which are recorded the data by the method of the present invention can be used in various fields as recording media for storage of computer programs, images, musical data and various data bases.

2 Claims, 21 Drawing Sheets

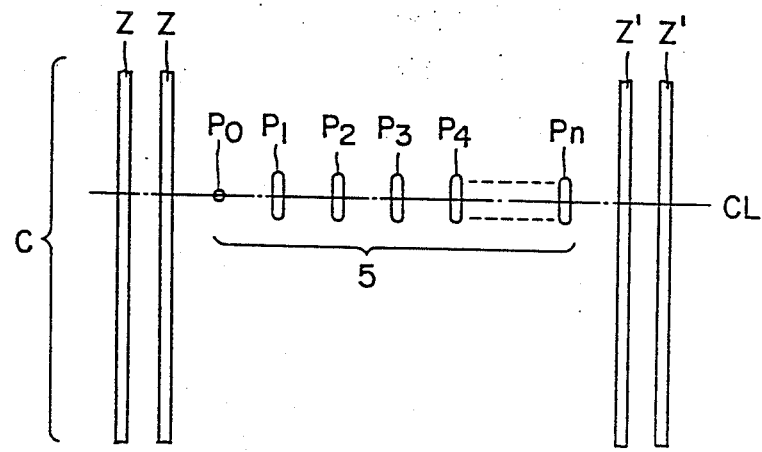
F I G. 4
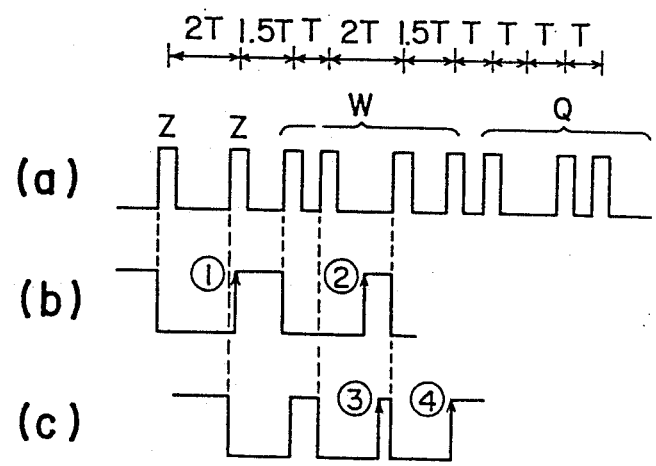
F I G. 7

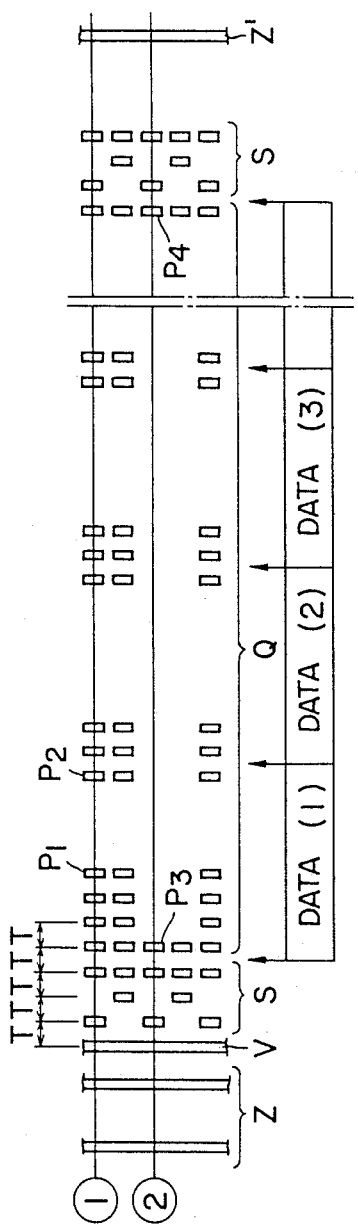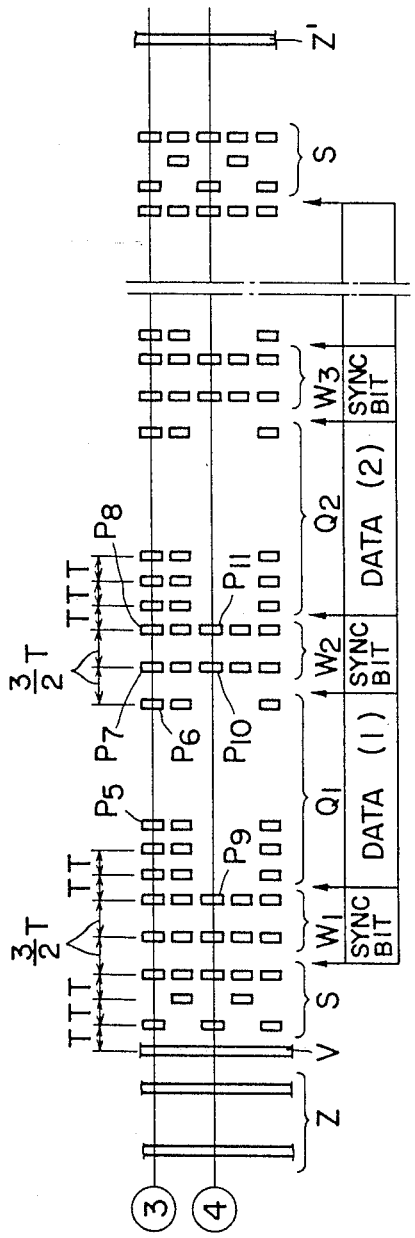

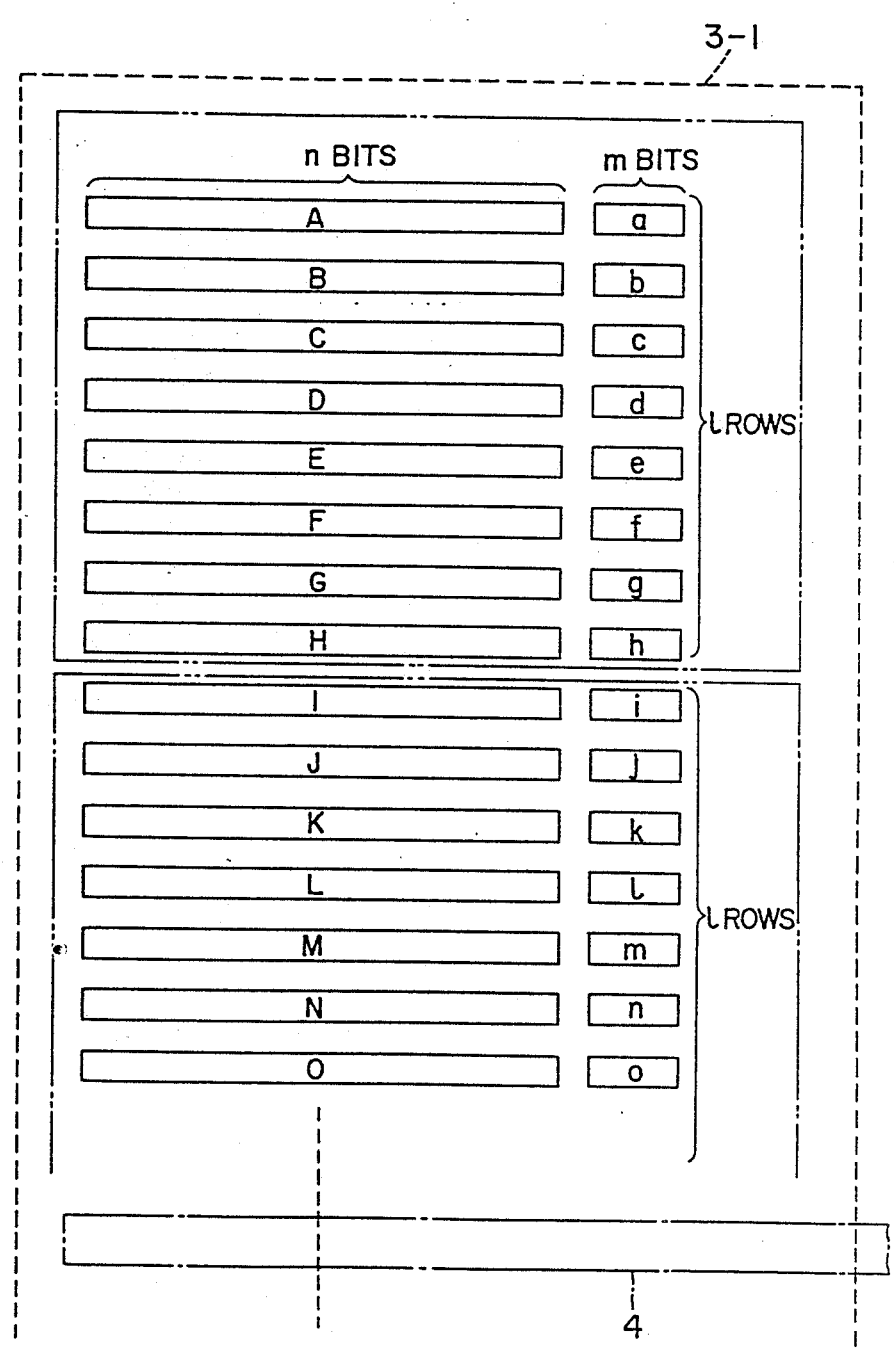
F I G. 16

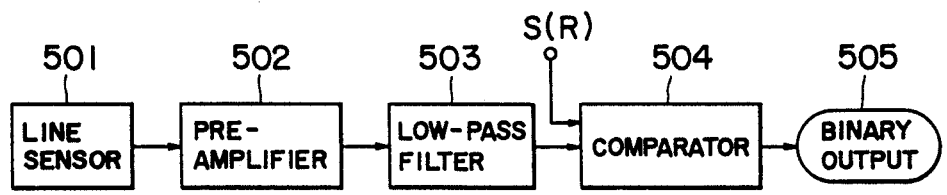
FIG. 26
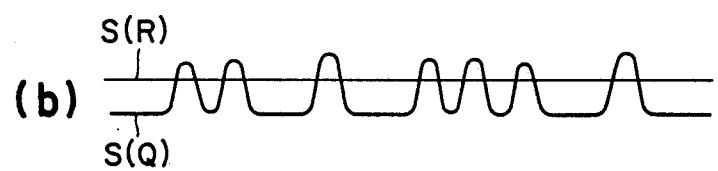
FIG. 27
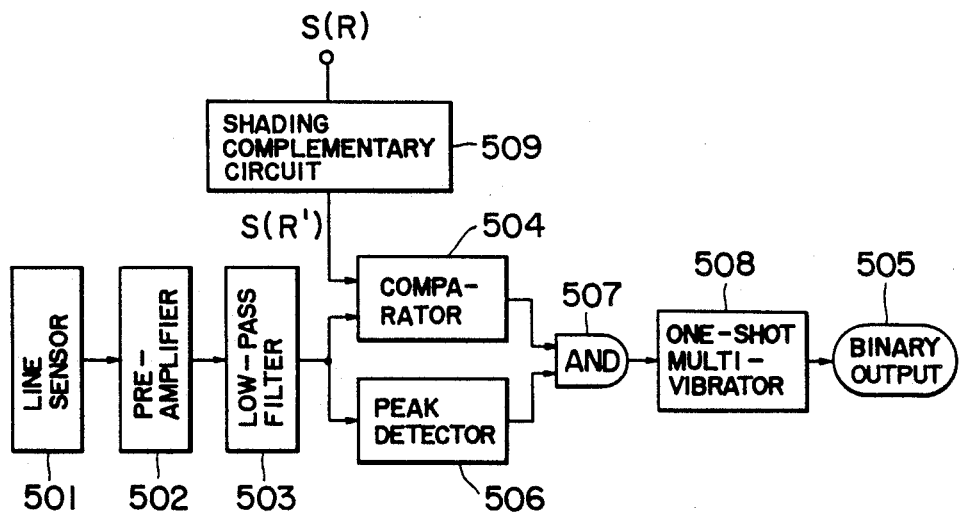
FIG. 28

METHOD FOR RECORDING DATA ONTO OPTICAL DATA RECORDING CARDS USING PITS FOR INDICATING THE CENTER LINE POSITIONS OF DATA ARRAYS PROVIDED ON SAID CARDS

This is a division of application Ser. No. 07/006,560 filed Dec. 18, 1986, now abandoned.

TECHNICAL FIELD

The present invention relates to a method for recording data onto optical recording cards and more particularly a method for recording data onto data cards in the form of pits by optical means.

BACKGROUND ART

At present, magnetic cards such as cash cards, credit cards and the like have been widely used, but recently there has been proposed an optical data recording card upon which is optically recorded information in order to improve recording density and to ensure reliable data storage. For instance, PCT/US 84/01463 (International Publication on Apr. 25, 1985: International Publication No. WO85/01818) discloses a technique developed by DREXLER TECHNOLOGY CORPORATION in USA concerned with optical data recording cards.

However, in order to accurately read out stored data and to efficiently access data, data must be recorded based upon a predetermined format. In order to attain an optimum format, there still exist various problems which must be solved and so far there has not been proposed a practical optimum method for recording data onto optical data recording cards. Especially in order to ensure the readout of data and the efficient access to data, the following practical problems constitute a barrier:

(Problem 1: control of a line sensor for reading out a unit readout array)

A line sensor reads out the data recorded in the form of pits from respective unit readout arrays and in order to properly shift the line sensor to a predetermined position for reading out the data stored in a specified unit readout array, a suitable data recording format must be devised. Especially, the control must be carried out accurately so that the direction of rows of the unit readout arrays must coincide with the direction of the sensor array of the line sensor with a high degree of accuracy (Problem 2: synchronization with data pits)

The data pits are recorded and spaced apart from each other by a predetermined distance. In case of reading out such data pits by the line sensor, the readout timing must be in synchronism with the distance between the pits. Therefore, a data recording format must be provided with a means for attaining such synchronization.

(Problem 3: discrimination between the adjacent unit readout arrays)

The line sensor reads out the data pits in respective unit readout arrays in the manner described above and when the data from one unit readout array is read out, the operation for reading out the data stored in the next unit readout array is executed. In this manner, a plurality of unit readout arrays are read out sequentially, but in case of scanning the line sensor, it must be detected that the operation for reading out the next readout array has been started. That is, a data recording format bearing the information capable of distinguishing between the adjacent unit readout arrays must be devised.

(Problem 4: countermeasures against readout errors)

In general, since individual person carries and uses the optical data recording cards, the data recording surfaces tend to be contaminated. Optical reading systems are very sensitive to such surface contamination, resulting in readout errors. It follows therefore that there must be devised a data recording format capable of avoiding such readout errors.

(Problem 5: efficient access to data)

As described above, since the optical data cards are carried by individual persons, their dimensions or sizes must be so selected that they may be put into pockets. Meanwhile, various data must be recorded in a limited space, therefore a data recording format capable of permitting the easy access to the stored data must be devised.

DISCLOSURE OF THE INVENTION

In view of the above, the primary object of the present invention is to provide a method for recording data on optical data recording cards in such a way that the stored data can be positively read out and the efficient access to the specified data can be ensured. In addition, the present invention was made to attain the following practical objects:

(1) the positive control of the readout operation by a line sensor for reading out the data stored in individual unit readout arrays;

(2) the positive synchronization with data pits in case of reading;

(3) the discrimination between the adjacent unit readout arrays in case of reading;

(4) the adoption of a suitable countermeasure against readout errors; and (5) the efficient access to the stored data.

A first feature of the present invention resides in the fact that a pit representative of a center line position of a data row is added to one end of the data row and a bar representing the boundary between the data rows is provided adjacent to one end of a data row, whereby the operation of a line sensor for reading respective unit readout arrays can be positively controlled.

A second feature of the present invention resides in the fact that in a data recording method of the type in which data are so recorded that an optical read device of the type having a plurality of one-dimensionally arrayed read elements in the X direction can scan in the Y direction perpendicular to the X direction, thereby reading the data stored in the form of pits, the improvement comprises at least two auxiliary marks each consisting of a plurality of bars which are different from each other in length, being elongated in the Y direction and arranged in the order of their lengths in the X direction, being provided in the X direction, whereby the inclination of the read head can be controlled with a high degree of accuracy.

A third feature of the present invention resides in the fact that in a recording method of the type for recording digital data onto an optical data recording card in the form of unit arrays, sync pit arrays are disposed in a region except the regions into which are recorded the digital data, whereby the positive synchronization with the data bits in case of reading can be ensured.

A fourth feature of the present invention resides in the fact that in a recording method of the type for recording digital data on an optical data recording card in the form of unit arrays, each data array is provided with a discriminating data indicating an even or odd numbered array so that the adjacent arrays can be distinctly distinguished from each other, whereby the stored data in respective arrays can be accurately read out.

A fifth feature of the present invention resides in the fact that in a data recording method of the type in which digital data are stored in respective arrays together with discriminating data for distinguishing the adjacent arrays, a discriminating data consists of more than three patterns represented by at least three bit data so that the adjacent arrays are distinctly distinguished from each other, whereby the data stored in respective arrays can be accurately read out.

A sixth feature of the present invention resides in the fact that in a recording method of the type in which digital data are recorded on an optical data recording card in the form of arrays, each data array consists of n-bit recorded data and m-bit error check data prepared from the n-bit recorded data; the data arrays are divided into blocks each consisting of l arrays; and a predetermined array in each block consists of error check data prepared from the whole remaining data arrays in said each block, so that in case of reading an error check is performed based on these error check data, whereby the accurate readout can be ensured.

A seventh feature of the present invention resides in the fact that, in a recording method of the type for recording digital data onto an optical data recording card in the form of arrays, the digital data are distributed into a plurality of divided data arrays which are scattered and arranged, whereby the reproducibility of error data can be improved when readout errors occur.

An eighth feature of the present invention resides in the fact that in a recording method of the type in which digital data are modulated and then recorded on an optical data recording card, pits are located at points at which the signal waveform obtained after by modulation varies so that information can be represented by the positions of pits, whereby even with a low-resolution read head, the pit position information can be accurately reproduced from the readout signal and then the data can be demodulated.

A ninth feature of the present invention resides in a fact that, in a recording method of the type for recording optical digital data onto an optical data recording card having a plurality of data recording regions, a region into which is recorded the information representing the arrangement of data stored in each data recording region is defined at a predetermined position of each data recording region, so that the read control and the data processing after the readout can be performed smoothly, whereby the efficient data access can be ensured.

BRIEF DESCRIPTION OF THE DRAWINGS

FIG. 4 is a view used to explain a recording method in accordance with the present invention which permits the control of the read operation for reading a unit readout array;

FIG. 7 (a)–(c), is a time chart used to explain the synchronizing operation in the recording method shown in FIG. 6;

FIG. 8 depicts a recording method of the present invention which can attain the synchronization with data pits;

FIG. 9 depicts a recording method of the present invention which can attain the synchronization with data pits;

FIG. 16 depicts a recording method in accordance with the present invention which can take countermeasures in case of readout errors;

FIG. 26 is a block diagram of a signal processing system of a read device for reading out the data stored on an optical data recording card by the method in accordance with the present invention;

FIG. 27, (a)–(c), is a view used to explain the mode of operation of the signal processing system shown in FIG. 26;

FIG. 28 is a block diagram of another signal processing system of a read device for reading the data stored on an optical data recording card by the method in accordance with the present invention;

BEST MODES FOR CARRYING OUT THE INVENTION

<General Description of Formats>

Figure 1A:
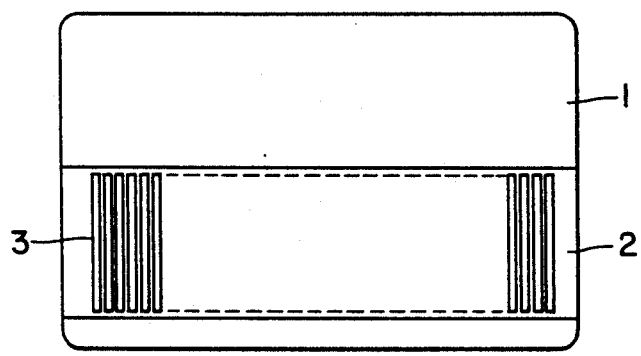
FIGS. 1(a) and 1(b) are schematic views of optical data recording cards onto which are stored the data by a method in accordance with the present invention.
Figure 1B:
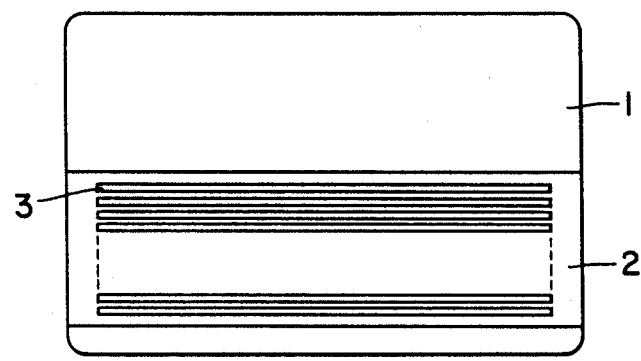

Now the present invention will be described in detail with reference to the best embodiments shown in the accompanying drawings. FIGS. 1(a) and 1(b) are views of an optical data recording card on which the data are stored by a first embodiment of the present invention. A data recording portion 2 is defined on the surface of a recording card 1 and a plurality of data recording regions 3 are defined in the form of stripes in the data recording portion 2. In FIG. 1(a), the data recording regions 3 are extended vertically while in FIG. 1(b) they are extended horizontally. Data are optically recorded in and read out from respective data recording regions 3.

Figure 2:
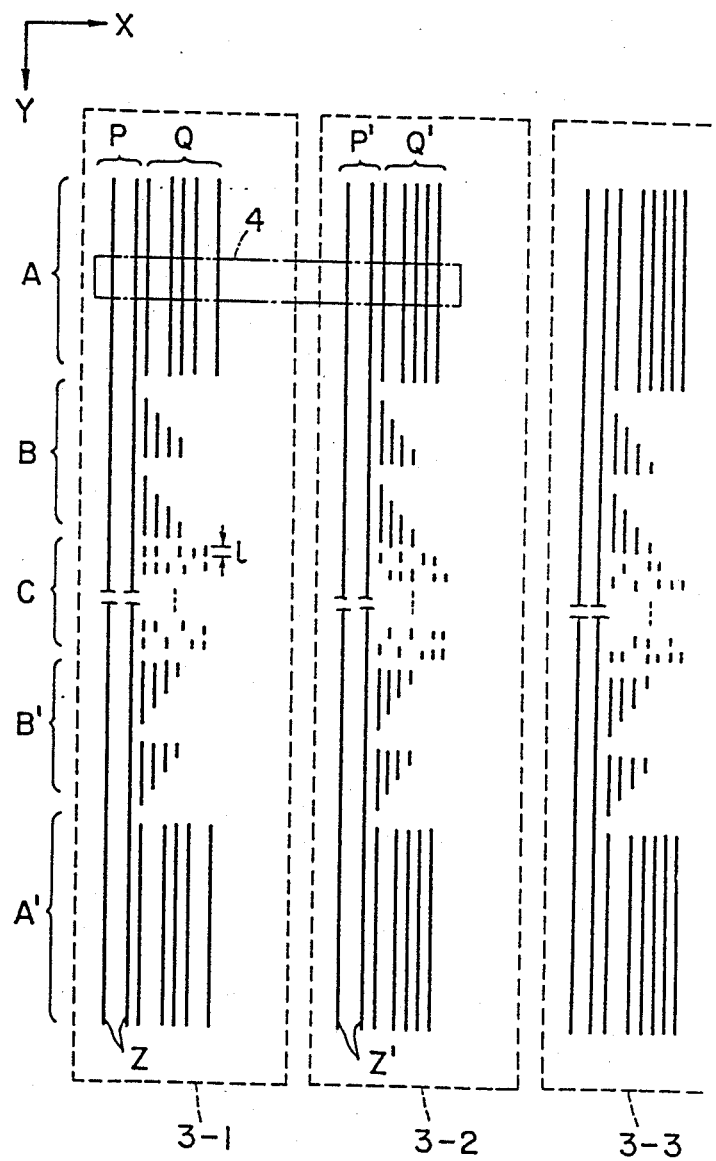
FIG. 2 is a fragmentary view, on an enlarged scale, of the optical data recording card shown in FIG. 1(a) and illustrating a recording format thereof.

In case of readout, a CCD line sensor or the like is generally used as a read head and is caused to scan each data recording region 3. For instance, in case of the card as shown in FIG. 1(a), the read head scans vertically each data recording region 3 and in case of the card as shown in FIG. 1(b), the read head scans horizontally each data recording region 3. Therefore, when the read head is inclined during the scanning step, the stored data cannot be read out accurately. Especially, the recording density of the optical data recording card is higher than that of the magnetic card so that in order to read out the stored data accurately, the read head inclination must be controlled with a high degree of accuracy FIG. 2 is a fragmentary view, on an enlarged scale, of the data recording regions 3 of the recording card shown in FIG. 1(a). A read control format region P (shown as consisting of two bars Z) is defined on the left side portion of each data recording region 3. The data used for controlling the read head is recorded in a predetermined format in the region P. In the read head, read elements are arranged in a horizontal array as indicated by the one-dot chain lines 4 and the read head 4 scans vertically from the upper end to the lower end of each data recording region 3 so that the stored data are read out from the data recording regions 3 which are spaced apart from each other in the horizontal direction. In practice, the data to be read out are recorded in the form of pit trains in a region Q.

In this embodiment, the region Q is further divided into five sub-regions A, B, C, B' and A'. Address data indicating an address of each data recording region are recorded in the sub-regions A and A'; auxiliary marks for correcting the inclination of the read head 4 are stored in the sub-regions B and B'; and an essential data are recorded in the sub-region C (partly shown in FIG. 2).

The read head 4 has a plurality of read elements arranged one-dimensionally in an array in the X direction in FIG. 2. Data are recorded in the form of pits in the sub-region C. The pits are elongated in the Y direction (and are l in length) and one array of pits arranged in the X direction is referred to as "a unit readout array". A plurality of unit readout arrays are arranged in the Y direction. The read head 4 reads pits in each unit array at one time. Therefore, when the read head 4 is caused to be deviated from the X direction and inclined as pointed out in the above-described problem, it reads out the pits in two arrays when the inclination of the read head 4 exceeds a predetermined degree so that it becomes impossible to read out the stored data accurately.

The data formats recorded on the respective regions will be described in detail hereinafter and the data recorded in the region P are used to solve the above-described problems 1, 2 and 3; the data stored in the regions A and A' are used to solve the above-described problem 5; and the data stored in the region B and B' are used to solve the above-described problem 1; and the data are recorded in the region C in a format capable of solving the above-described problem 4.

<Recording method for controlling the read operation by a line sensor for reading each unit readout array>

EMBODIMENT 1

Figure 3:
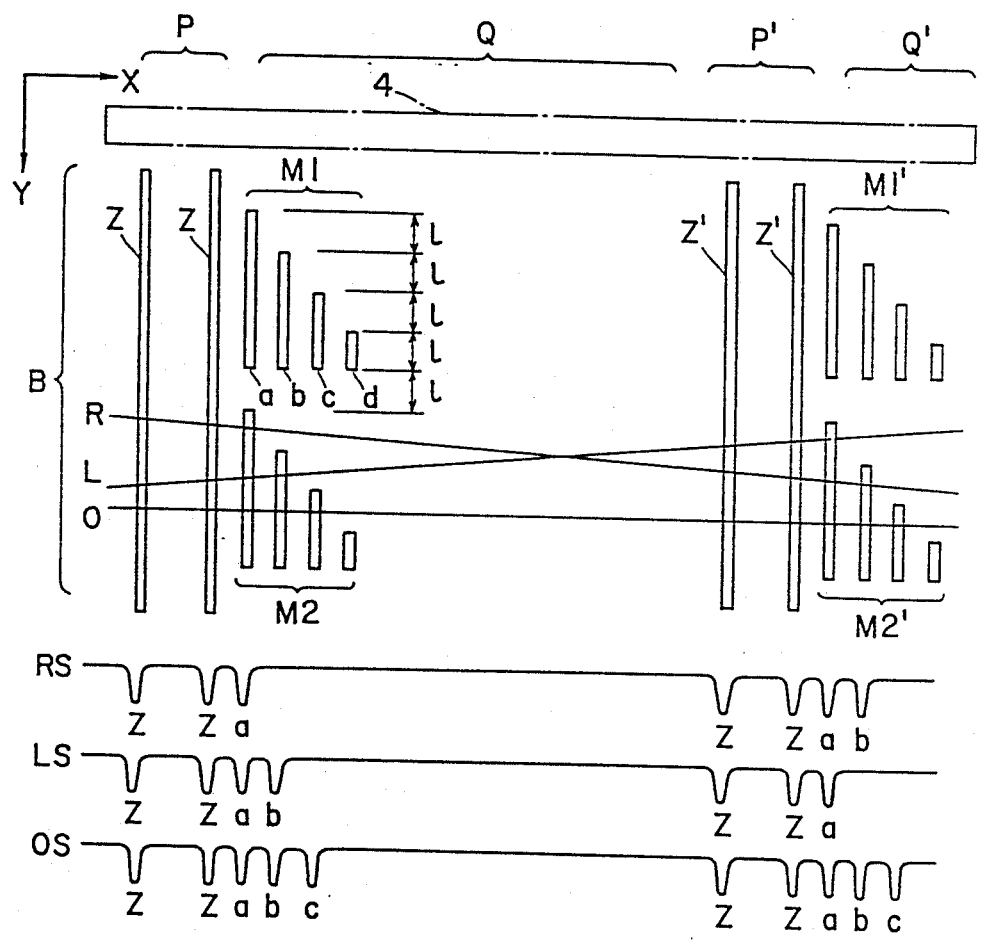
FIG. 3 is a fragmentary view, on an enlarged scale, of a region B of the format shown in FIG. 2.

As described above, in FIG. 2, each region surrounded by the broken lines represents one data storage region and a part surrounded by the one-dot chain lines represents the read head 4. The region P is defined by two bars Z extended continuously vertically as will be best understood from FIG. 3. FIG. 3 shows the region B, in an enlarged scale, of FIG. 2. In response to the reading of the position of the two bars Z, the horizontal position of the read head 4 is determined. More particularly, the read head is controlled in such a way that the two bars Z are normally located at the left side of the read head. The two bars Z are straight lines which extend continuously from the upper end to the lower end of each data recording region 3 and the read head 4 scans vertically downwardly along the bars Z in each data recording region 3. In FIG. 3, the read head 4 is in the position for scanning the region 3-1 and the right end portion thereof partially covers the adjacent region 3-2.

In order to correct the inclination of the read head 4, the auxiliary marks M1, M1', M2 and M2' are marked in the regions B and B'.

The bars Z are used as a guide for causing the read head 4 in the Y direction in FIG. 3 and the read head 4 reads out these auxiliary marks. Each auxiliary mark comprises four bars a, b, c and d which are different in length. Each bar is elongated in the Y direction and the four bars are arranged in the order of their lengths in the X direction. It is preferable that the difference in length between the adjacent bars is shorter than the length l in the Y direction of a data pit in the region C of FIG. 2. The auxiliary marks each consisting of four bars a, b, c and d as described above are marked in each data recording region and the read head 4 simultaneously reads out the auxiliary marks in the adjacent data recording regions. For instance, even though the auxiliary marks M1 and M1' belong to the different data recording regions, they are simultaneously read out. In this embodiment, a pair of such auxiliary marks are arranged in two stages. That is, the auxiliary marks M1 and M1' are paired while the auxiliary marks M2 and M2' are paired. The reason why the auxiliary marks are arranged in two stages is to ensure the positive reading. It follows therefore that the auxiliary mark may be arranged in one stage or the auxiliary marks may be arranged in a plurality of stages.

In FIG. 3, lines 0, R and L represent the normal scanning, the scanning by the read head 4 inclined to the right and the scanning by the read head 4 inclined to the left, respectively. When the read head 4 passes the auxiliary mark in case of normal scanning, the readout signal as indicated at OS is obtained. A letter attached to each peak indicates a bar read out. The fact that the number of peaks at the right portion of the readout signal is equal to that at the left portion thereof indicates the normal scanning. When the read head 4 is inclined to the right; that is, when the read head 4 reads out the auxiliary marks along the line R, the readout signal RS is obtained. The number of peaks at the right portion of the readout signal is higher than that at the left portion thereof so that it is detected that the read head 4 is inclined to the right. Therefore, the read head 4 should be inclined to the left to the normal scanning position. On the other hand, when the read head 4 is inclined to the left; that is, when the auxiliary marks are read out along the line L, the readout signal LS is obtained. The number of peaks at the left portion of the read out signal LS is higher than that at the right portion thereof so that it is detected that the read head 4 is inclined to the left. Therefore the read head 4 should be inclined to the right to the normal scanning position.

Thus the readout signal obtained when the read head 4 scans the auxiliary marks is detected and analyzed, and the inclination of the read head 4 can be determined so that it becomes possible to control the read head 4 so as to eliminate its any inclination in relation to the normal scanning line 0. So far it has been described that the auxiliary marks in the adjacent data recording regions are paired, but it is understood that a pair of auxiliary marks may be arranged in the same data recording regions. In the latter case, it is preferable that the auxiliary marks are spaced apart from each other as far as possible in order to ensure a predetermined degree of accuracy.

As described above, according to the embodiment 1, in case of the optical digital data recording, at least two auxiliary marks each consisting of a plurality of bars having different length are provided so as to detect the inclination of the read head so that the inclination of the read head can be controlled with a high degree of accuracy.

EMBODIMENT 2

FIG. 4 shows another recording method which permits the control of a line sensor for reading a unit readout array and is a view of the region C, on an enlarged scale, of FIG. 2. For the sake of explanation, only one unit readout array is shown. A unit readout array 5 comprises a leading pit $P_0$ and data pits $P_I$-$P_n$ whose centers are on a center line CL and which are spaced apart from each other by a predetermined distance. The leading pit $P_0$ is used to indicate the position of the center line CL, and its length in the direction perpendicular to the center line CL which is called a pit length is considerably shorter than those of the data pits $P_I$-$P_n$.

The data pits $P_I$-$P_n$ have a long pit length so that their existence can be positively detected by the line sensor.

Since the leading pit $P_0$ and the data pits $P_I$-$P_n$ are arranged in the manner described above, when the line (not shown) detects the leading pit $P_0$, it can also detect the data pits $P_I$-$P_n$. In general, the relative angular relationship between the line sensor and a card is such that the line sensor is slightly deviated from the center line CL. Therefore even when the angle of the card in relation to the line sensor is relatively great, there is no fear that the line sensor fails to detect the data pits $P_I$-$P_n$ and especially the last pit $P_n$.

The unit readout array 5 arranged in the manner described above is interposed between bars Z and Z' which function as guides in case of scanning by the line sensor as described above, represent the side boundaries of the unit readout array 5 and are continuously extended in the direction perpendicular to the center line CL of the unit readout array.

So far it has been described that the pit $P_0$ representative of the position of the center line CL is positioned at the leading end of the unit readout array 5, but it is understood that it may located at the trailing end thereof. In short, it suffices that even when the direction of the unit readout array 5 and the scanning direction of the line sensor 4 are deviated from each other by a small angle, the line sensor can detect all the pits P. The bars Z and Z' not only guide the line sensor 4 but also represent the side boundaries of the unit readout array 5 so that they may be discontinuous and that only one bar may be provided for a plurality of unit readout arrays.

As described above, according to the embodiment 2, the pit representative of the position of the center line of a data train is located at either end thereof and the bars are extended adjacent to the ends of the data trains to define the boundary lines between the data trains so that the scanning direction of the line sensor can be accurately aligned with the direction of each data train and that the arrangement of each data train can be distinguished with a high degree of accuracy.

<Recording method capable of attaining the synchronization with data pits>

EMBODIMENT 3

Figure 5:
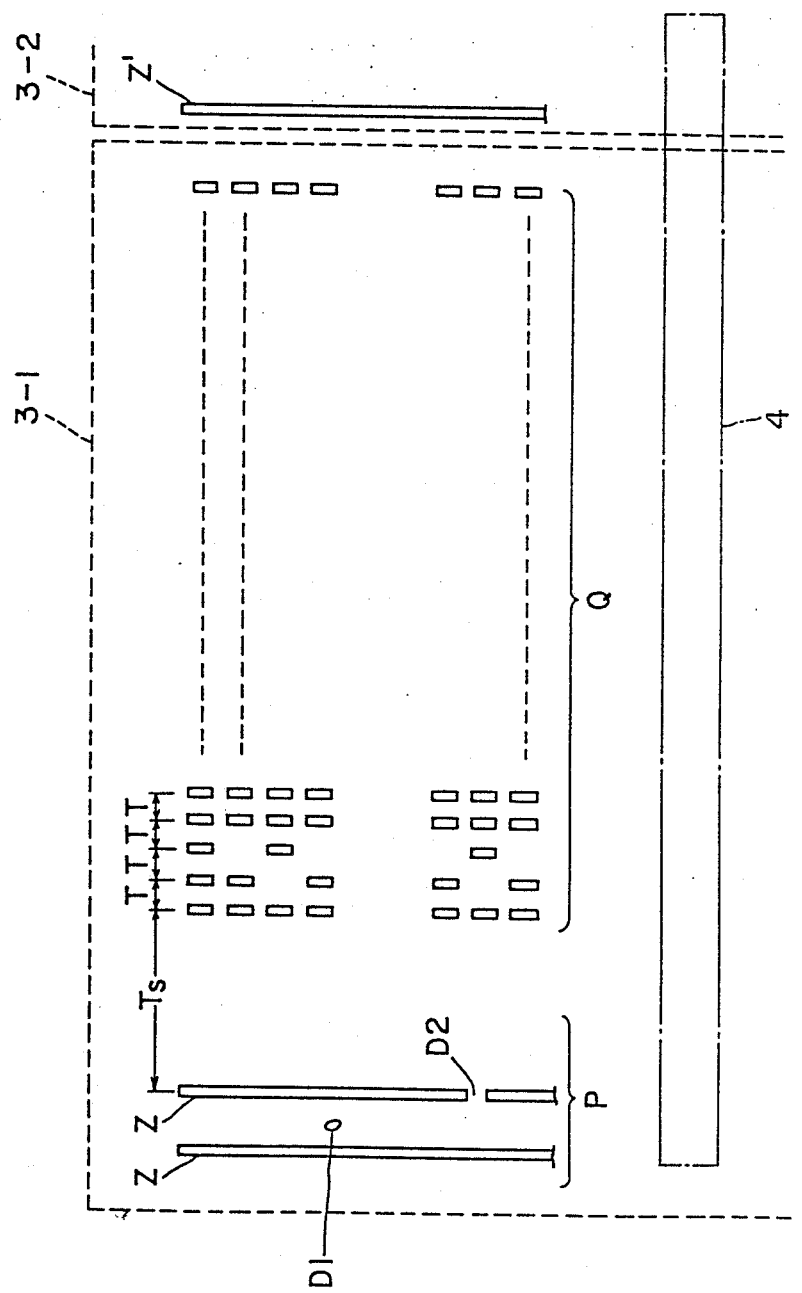
FIG. 5 depicts a recording method of the present invention for attaining the synchronization with data pits.

A unit readout array consists of a plurality of data pits spaced apart from each other by a predetermined distance. In case of reading such a unit readout array, the read operation must be carried out at a timing synchronized with the distance between the pits. For instance, assume the case in which information of any arbitrarily selected bit train is read out by the read head 4 as shown in FIG. 5. In general, the read operation is carried out from the left to the right of the read head 4. Therefore, first the readout signals corresponding to two bars Z appear and then after a time interval Ts, the readout signal corresponding to each pit appears at a period T. In order to read the respective data pits as digital data, the signal processing system must establish synchronization. One method for attaining such synchronization is based on the time interval Ts. That is, after the time interval Ts has elapsed from the detection of the second pulse (corresponding to the second bar Z) in the readout signal, the synchronization is attained. Thereafter when the synchronization is attained every period T, information in one pit train can be read out.

However, the above-described synchronization method has a defect that it cannot attain an accurate synchronization. For instance, when a contaminant D1 exists as shown in FIG. 5, it is counted as the second pulse so that the precise synchronization cannot be attained. Furthermore, if a contaminant or defect D2 exists on the bar Z, the timing of synchronization is deviated.

EMBODIMENT 4

Figure 6:
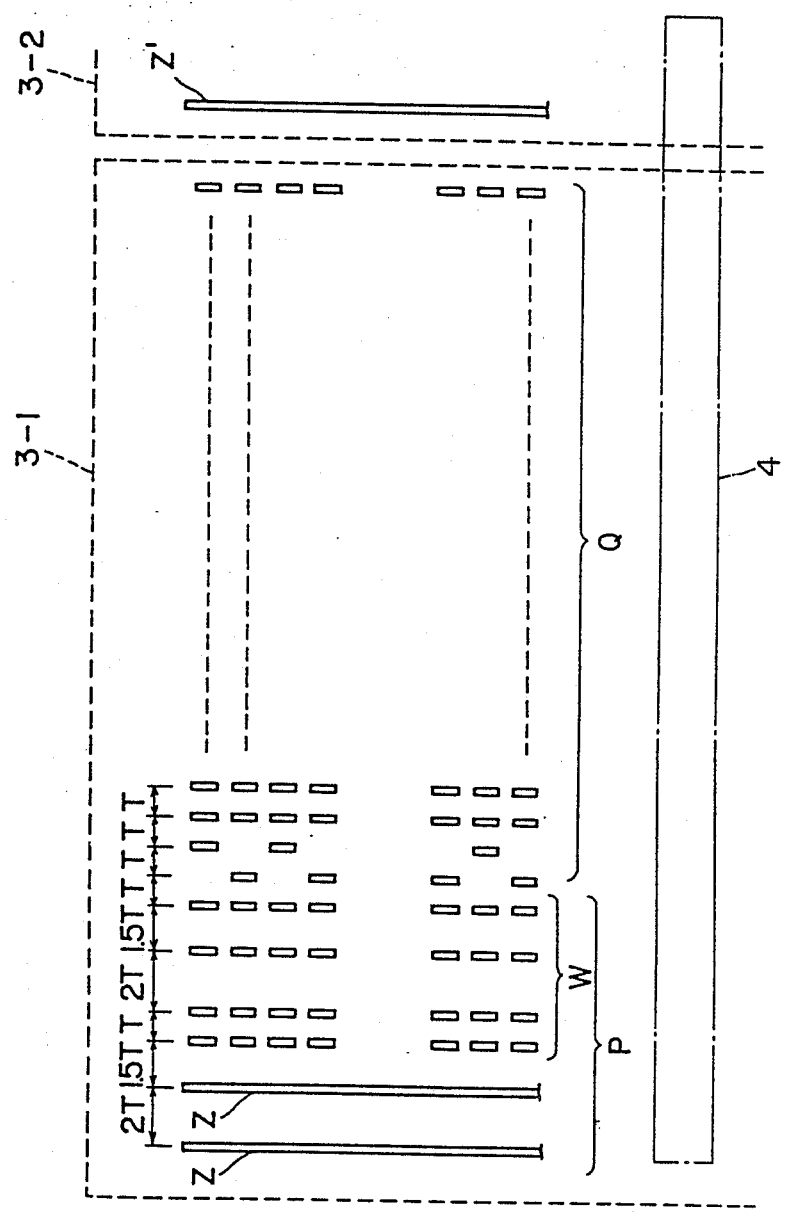
FIG. 6 depicts a recording method of the present invention for attaining the synchronization with data pits.

In view of the above, it is preferable that not only the bars Z but also sync signal pit trains W are arranged in the region P as shown in FIG. 6 so that the synchronization can be attained based on each sync signal pit train W. In this embodiment, the spacing between the pits in the adjacent sync signal pit trains W bears information. That is, while the data pits in the region Q are arranged at the period T, the spacing between the pits in the adjacent sync signal pit trains W is varied to T, 1.5T, 2T and so on.

Next referring to FIG. 7, the method for establishing the synchronization by reading such a pit train W will be described. Signal (a) shows a readout signal derived by the read head 4 and the reference characters attached to the respective peaks represent the corresponding bars and pits shown in FIG. 6. Signal (b) shows a signal representative of the leading edge of the data train and, in general, is at a high level, but drops to a low level in synchronism with the rising edge of the signal (a). Thereafter, the signal (b) rises again to a high level after an elapse of time $2T+\alpha$ ($\alpha$ is equal to a half of the pulse width is signal (a)). Signal (c) shows a sync signal and, in general, is at a high level, but drops to a low level in synchronism with the rising edge of the signal (a). Thereafter, the signal (c) rises again to a high level after an elapse of time $1.5+\alpha$. When signal (a) is a high level at the rise 1 of signal (b) and a low level at the rise 2 of the same, it is confirmed that the leading part of a pit train is about to be read out. Meanwhile the sync timing for reading out the pits in the region Q is determined in response to the rise 3 and 4 of the signal (c).

The leading part of the data train is confirmed by reading the bars Z and the pit train W in the manner described above and the preparation for establishing the synchronization for reading out the pits recorded in the succeeding region Q is made. The method for controlling the synchronism in response to the pit train W is not limited to that described above and any other suitable means may be used. As described above, according to the EMBODIMENT 4, the sync signal pit trains are located at the leading part of respective data trains so that the positive synchronization can be ensured.

EMBODIMENT 5

FIG. 8 is a view used to explain another recording method capable of attaining the synchronization. Each readout array consists of positioning bars Z and Z', a sync signal bar V, array discriminating pits S and a data pit region Q. The positioning bars Z represent the position from which the read operation by the line sensor is started and the sync signal bar V serves to attain the synchronism of a read period. The pit positions are repeatedly defined at a predetermined time period T from the sync signal bar V. The discriminating pits S are information pits for discriminating one train or one unit readout array from another and will be described in more detail hereinafter. Therefore, only the pits for establishing the synchronization will be described. The data pit region Q is interposed between the discriminating pits S and in the data pit region Q, the data are recorded in the form of pits which appear or do not appear at a period T. The unit readout array extended from the positioning bars Z to the bar Z' of the adjacent data recording region is read out simultaneously.

In this embodiment, the synchronism is controlled by the sync signal bar V. After the synchronization for the read operation is established by the bar V, the reading of the succeeding pits at the period T is carried out in the line sensor. This method suffices to provide the bar V for establishing the synchronization so that there is an advantage that the construction is much simplified but there is a defect that an erratic operation tends to occur in response to the presence of a contaminant on a card.

EMBODIMENT 6

In the embodiments described above with reference to FIGS. 6 and 8, the synchronism is established at the leading part of the unit readout array and in response to the sync timing thus established, the succeeding pit train is read out. In this case, the measurement of the pit period T is made by a counter which counts clock pulses, in general, having a shorter pulse duration. However, in practice, it is impossible to completely coincide the read period thus obtained with the pit position period T so that it has a small error. Becasue of such errors, the read period is gradually deviated from the pit position period, but this defect can be eliminated to read out the next pit. For instance, in FIG. 8, in case of reading out the unit readout array 1 by the line sensor, even when the read period is slightly deviated after reading the pit $P_1$, when the counter is reset in response to a pulse for reading the next pit $P_2$, the deviation is eliminated. Even when the read period is deviated more or less when the pit $P_2$ is read out, there arises no problem at all because each pit has some width.

However, the above-described recording method has a problem that when no pit is detected continuously for several periods, accurate readout cannot be ensured. A plurality of data groups are continuously stored in the data pit region Q. More particularly, a series of data groups consisting of the data (1), the data (2), the data (3) and so on are recorded in FIG. 8. For instance, one data group may consist of one byte data or eight pit positions. In order to increase the data-packing density, one unit readout array may consist of 4- or 8-byte data. Now let us consider the case of reading the unit readout array 2 in which the state having no pit continues for a considerably long time interval. That is, the state having no pit continues for a considerable long time interval after reading the pit $P_3$ until the next pit $P_4$ is read out. Then, as described above, a slight read period deviation is accumulated and such accumulated deviation cannot be corrected until the pit $P_4$ is read out. As a result, the deviation accumulated before the pit $P_4$ is read out exceed a readout margin defined by the width of the pit $P_4$.

Therefore a recording method as shown in FIG. 9 is proposed to solve such problem. In both FIGS. 8 and 9, same reference symbols are used to designate similar parts so that the pits described above with reference to FIG. 8 will not be described again. The recording method as shown in FIG. 9 is different from that as shown in FIG. 8 in that sync pits are provided between the data groups. More particularly, the sync pits $W_1$ are formed at the leading part of the data groups and then the first data group or data (1) is recorded in the data region $Q_1$. Thereafter the sync pits $W_2$ are formed and then the second data group or data (2) is recorded in the data region $Q_2$. Next the sync pits $W_3$ are formed and then the third data group is recorded in the third data region $Q_3$. In this manner, the sync pits and the data groups are alternately recorded. The sync pits $W_1$ are always provided with a pit or pits so that a deviation in read period can be corrected by reading out the sync pits $W_1$. For instance, assume that, as shown in FIG. 9, the data (1) is a data group consisting of one byte data and that every data represent information without any pit. Then after the synchronism is controlled by the sync pits $W_1$, the synchronization is always established by the sync pits $W_2$ again so that a deviation in read period is equal to the accumulation of deviations resulting during the eight pit period at the most.

The sync pits $W_1$ may be arranged at the same period T as other data pits, but in this embodiment, the sync pits consist of the first sync pit $P_7$ and the second sync pit $P_8$ and the distance between the first sync pit $P_7$ and the data pit $P_6$ immediately before the sync pit $P_7$ is $(3/2)T$ while the distance between the first and second sync pits $P_7$ and $P_8$ is also equal to $(3/2)T$. The period of the sync pit is varied as described above, it becomes possible in case of reading to distinguish the sync pits from other pits, whereby more positive readout can be ensured. For instance, let us consider the case of reading the unit readout array 3 in FIG. 9. Then the synchronization is established in response to the data pit $P_6$ and then the succeeding pit $P_8$ is recognized as a sync pit by the first sync pit $P_7$ so that the synchronization is established by the second sync pit $P_8$. In case of reading the unit readout array 4, the data (1) has no pit at all, but after the synchronization is established in response to the second sync pit $P_9$, the succeeding pit $P_{11}$ is recognized as a sync pit by the first sync pit $P_{10}$ so that the synchronization can be established by the second sync pit $P_{11}$. Two sync pits always have a pit or pits so that regardless of the contents of the data stored, the accurate synchronization can be established at each boundary between the data groups.

The recording method in which the sync pits have a period of $(3/2)T$ has an additional merit that the start bit and the end bit are automatically added for each data group.

In general, in order to process the digital data read out, the steps for adding the start bit at the leading edge of a data group and the end bit to the trailing edge thereof are required. However, according to this embodiment, the start bit "1" and the end bit "00" (the state having a pit corresponds to "1") are automatically added to each data group. For instance, the data (1) in the unit readout array 3 in FIG. 9 is an eight-bit data of "11100001". After the last bit "1" (corresponding to the pit $P_6$) has been read out, the data read device of the line sensor successively reads out the data by sampling at the period T so that a "0" bit (corresponding to the distance between the pits $P_6$ and $P_7$, a "0" bit (corresponding to the distance between the pits $P_7$ and $P_8$) and a bit "1" (corresponding to the pit $P_8$) are read out. When the first two "0"s are used as the end bits of the data (1) while the last bit "1" is used as the start bit of the data (2), a serial data train thus obtained can be directly transmitted to the processing system.

As described above, according to EMBODIMENT 6, the sync pits are interlaced between a plurality of data groups in each unit readout array so that it becomes possible to accurately read out any data.

EMBODIMENT 7

The above embodiment has been described on the assumption that the pits are formed at the period T in the data pit region Q and the period T is a period at which the data were stored. Theoretically speaking, when the data storage period is equal to the data readout period, the accurate readout is possible.

However, in practice, there exists a problem that the period of the pits stored is deviated from the read period. Various factors are considered to cause such problem. For instance, the pit distance is varied due to the deflection, expansion and so on of an optical data recording card which is a recording medium. In this case, depending upon the materials of the optical data recording cards and the storage conditions thereof, the pit distance varies from one card to another. Furthermore, it may be considered that even in the same card, the pit distance in the left data storage region 3 of the card shown in FIG. 1(a) is different from that in the right data storage region 3. A further cause is due to the characteristics of an optical system incorporated in a read head. When the focused image is blurred due to aberration of lenses, the light sensor detects that the pit distance varies even in the same unit readout array. In addition, when an optical data recording card is deflected or bowed, the focal point of the optical system is deviated so that the pit distances are detected as being varied from each other.

Figure 10:
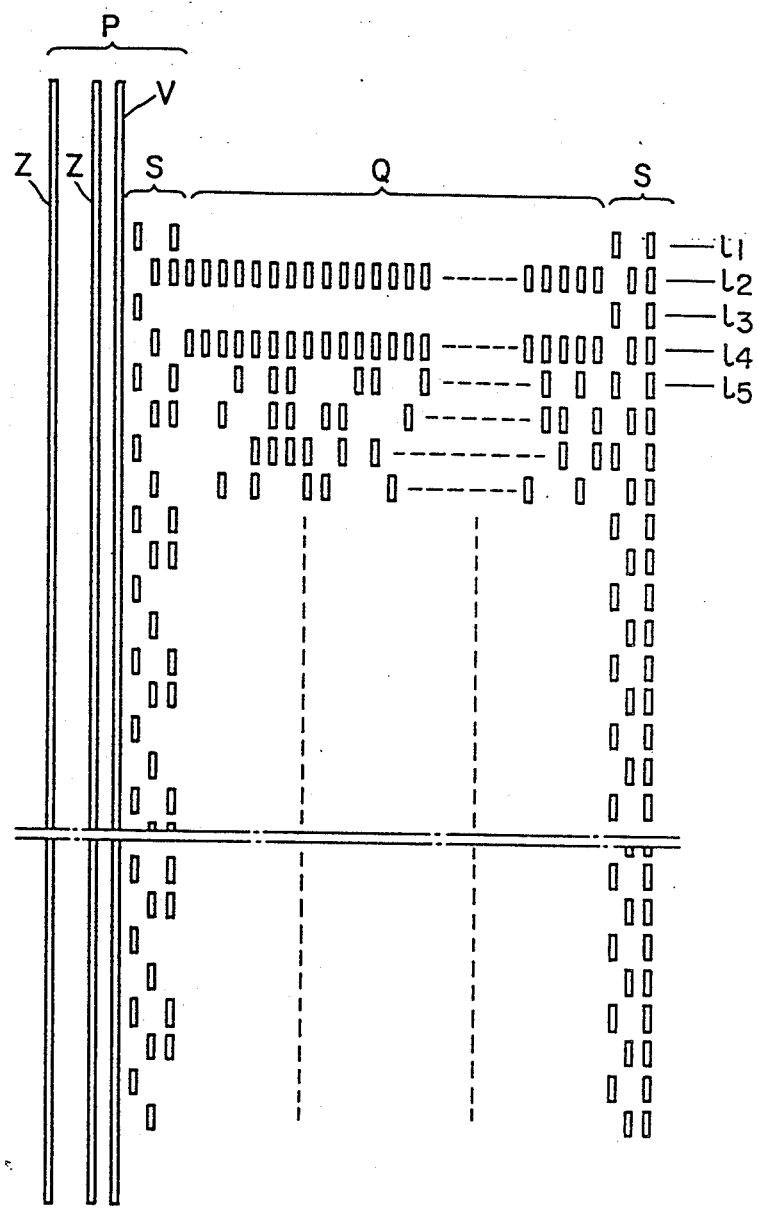
FIG. 10 depicts a recording method of the present invention which can attain the synchronization with data pits.

Therefore, there is a case in which when the pits are read out always at the same pit period T, it becomes impossible to accurately read out the stored data. It follows therefore that it is preferable to read out each pit at an optimum pit period $(T \pm \delta)$ (where $\delta$ is a correction). FIG. 10 shows an embodiment of a recording method which permits the data readout in the manner described above.

A unit readout array of this embodiment is substantially similar in arrangement to that shown in FIG. 8. That is, each unit readout array consists of positioning bars Z, a sync bar V, a data pit region Q and pits S for discriminating the unit readout arrays. This embodiment is different from the recording method described above with reference to FIG. 8 in that information concerning a data pit repetition frequency and a distance between the adjacent unit readout arrays is stored in a part of the upper unit readout arrays; that is, in four arrays $l_1-l_4$. As shown in FIG. 10, the data pit regions Q of the first and third arrays $l_1$ and $l_3$ have no pit while the data pit regions Q in the second and fourth arrays $l_2$ and $l_4$ have pits. The former arrays represent the data "0000 ... 0" while the latter arrays represent the data "1111 ... 1", both of which represent no specific meaning. But they serve to deliver not only the inherent data pit repetition frequency in the data recording region but also the repetition frequency of the unit readout arrays. More specifically, when the readout system reads out the second or fourth array $l_2$ or $l_4$ and these horizontal pit positions are memorized, every data pit position can be recognized. Thus it becomes possible to read out the data pits in the fifth array $l_5$ and the succeeding arrays at a period corresponding to the pit position memorized. Furthermore, one half of a time interval from the time when the reading of the second array $l_2$ is started to the time when the reading of the fourth array $l_4$ is started is recognized as a repetition frequency between the unitary readout arrays. Therefore, when this time interval is memorized, the fifth array $l_5$ and its succeeding arrays can be read out at the distance period memorized.

In the above-described embodiment, the upper four arrays are used to represent a pit frequency, but it is understood that only two or one array can be used to represent a pit frequency. However, in order to improve the accuracy, it is preferable to use four arrays as described above.

In the above-described embodiment, the readout arrays $l_1 \sim l_4$ are arranged at the upper portion of the region C in FIG. 2, but it is to be understood that they may be arranged at the upper portion of the region B or A. For instance, when they are arranged at the upper portion of the region A of the data recording region 3, each data storage region can be read out at an optimum pit period even when the pit period varies from one data storage region 3 to another due to the distortions of an optical system.

As described above, according to this embodiment, a part of unit readout arrays are used to represent a pit period so that every data can be readout at an optimum pit period under any readout conditions.

<Recording method for permitting the discrimination between the adjacent unit readout arrays>

Figure 11:
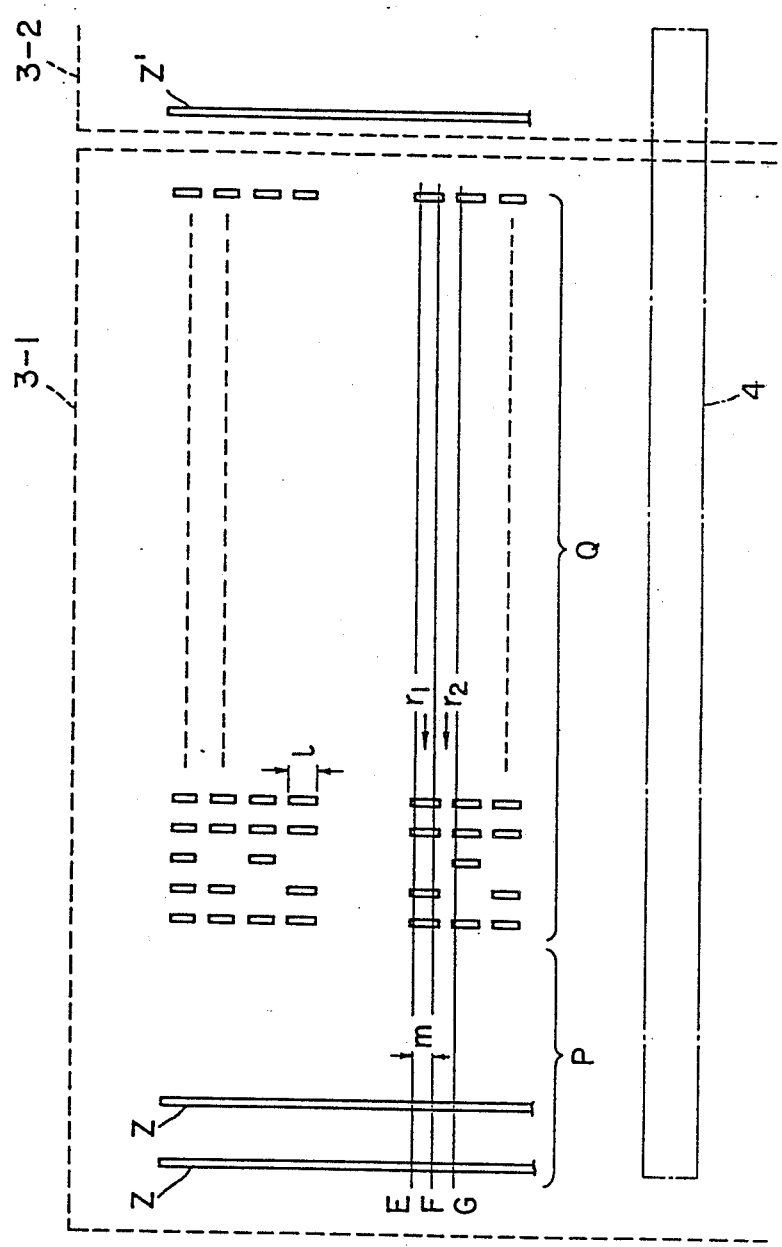
FIG. 11 depicts a recording method in accordance with the present invention which permits the discrimination between the adjacent unit readout arrays.

As described above, the unit readout arrays are read out sequentially scanned and read out by the line sensor and in this case it becomes necessary to discriminate one unit readout array from another. The reason will be described with reference to FIG. 11. A data recording or storage region 3-1 is divided into a region P and a region Q as shown in FIG. 11 and in the region P, two bars Z which are used as a guide for the read head 4, a sync pit train (not shown) and other data pits used to control the read operation (not shown) are formed. The read head 4 comprises a plurality of read elements arranged in a horizontal array as indicated by the one-dot chain lines and is adapted to vertically downwardly scan so that the data is read out from a horizontal array or unit readout array. In this case, the read head 4 is so controlled in position that the bars Z are always located at the left end of the read head 4. The data which must be read out are stored in the region Q in the form of pit arrays.

Theoretically speaking, only one read operation suffices to read out the data from each array, but in practice it is preferable to repeat the read operation a few times so that the same data is read out a few times and consequently with high degree of accuracy. FIG. 11 shows an example in which the read head 4 scans each array twice. That is, the line segments E, F and G indicate the positions at which the read head 4 reads out the data. That is, when the read head 4 scans vertically downwardly, it reads out the data at a predetermined distance m. When the distance m is selected smaller than the pit length l, one array is read out at least twice. In practice, it is preferable to read out each array four or five times.

However, there is difficulty in the recording method as shown in FIG. 11 to read out several times each array in the manner described above, because it is difficult to determine which one of a series of read out data is read out from which array. For instance, in FIG. 11, the read positions E and F belong to the array $r_1$ while the read position G, to the array $r_2$. However, it cannot be discriminated which data read out at the read positions E, F and G belongs to which array. When it is possible to read out each array twice without fail, one-to-one correspondence between each read out data and each array can be established by dividing each read out data into two and then counting the divided data read out. However, when the dimensional accuracies of each pit length l and the read distance m are taken into consideration, it becomes impossible to carry out the above-described readout process. As a result, one array would be read out twice, another array would be read out three times and so on so that it becomes impossible to estimate how many times each array is read out. Therefore, it becomes necessary to devise a recording method capable of reading respective data from respective arrays with a high degree of accuracy.

EMBODIMENT 8

Figure 12:
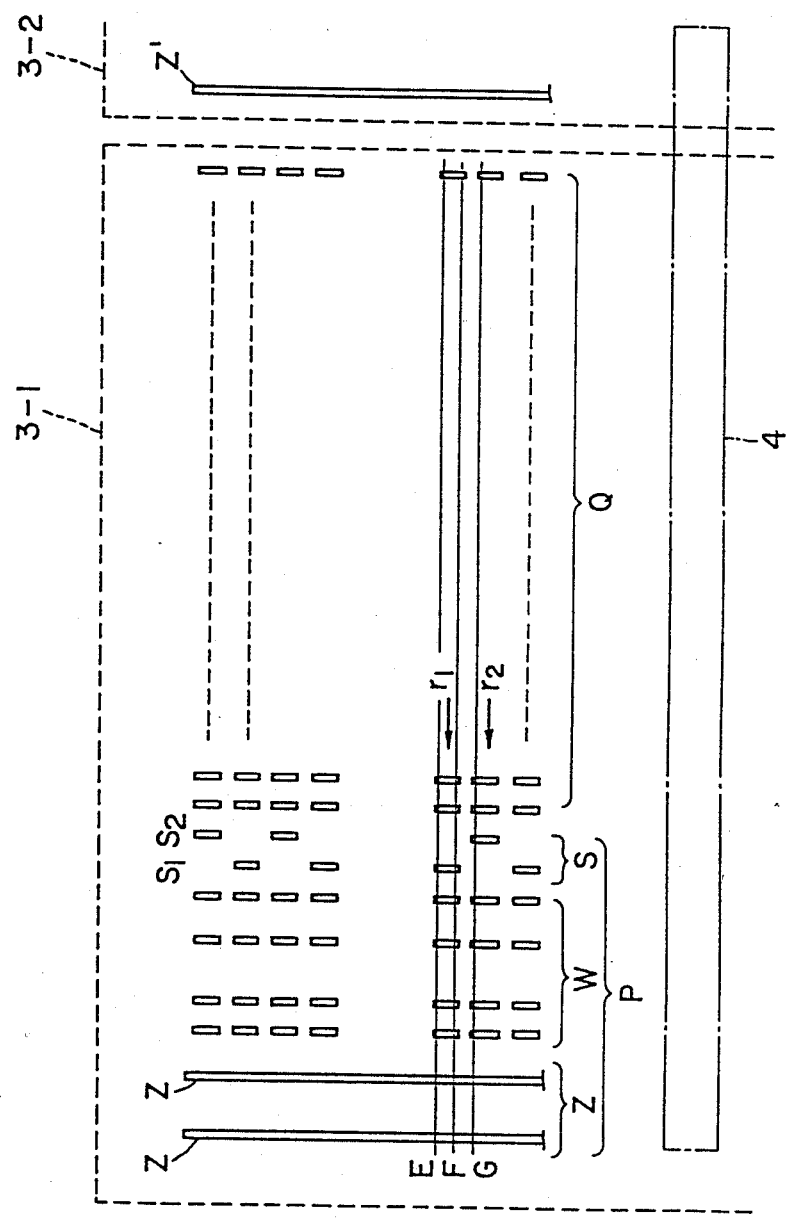
FIG. 12 depicts a recording method in accordance with the present invention which permits the discrimination between the adjacent unit readout arrays.

FIG. 12 shows one embodiment of a recording method capable of distinguishing between the adjacent unit readout arrays. This recording method is similar to the recording method described above with reference to FIG. 11 in that two bars Z for guiding the read head 4 are disposed at the left portion and the data which must be read out are stored in the region Q in the form of pit arrays. In the region P, sync pit arrays W are disposed on the right side of the guide bars Z in order to establish the synchronization in case of reading out the data from each array as described in detail in the above-described embodiments so that the detailed explanation thereof shall not be made further here. One of the primary features of this embodiment resides in the fact that discriminating data arrays S are disposed between the pit arrays W and the region Q. The pit arrays S have information for discriminating an even-numbered array from an odd-numbered array. Such information may comprise only a single bit, but according to this embodiment it comprises two bits $S_1$ and $S_2$ to ensure redundancy. More specifically, the combination of $S_1 = 1$ and $S_2 = 0$ represents an odd-numbered array while the combination of $S_1 = 0$ and $S_2 = 1$ indicates an even-numbered array. Any other combinaiton except the above two combination represents an error.

For instance, assume that the read operation is carried out at each of the read positions E, F and G in FIG. 12 Then at the read positions E and F, $S_1 = 1$ and $S_2 = 0$ so that it becomes possible to recognize that the readout signal is derived from an even-numbered array. Therefore, the signals read out at the read positions E and F, respectively, may be processed as the data read out from the same array $r_1$ in the succeeding processing system while the signal read out at the read position G may be processed as the data derived from the next array $r_2$.

As described above, according to the embodiment 9 of the present invention, in the optical digital data recording method of the type in which each data is recorded in each array unit, the discriminating data for discriminating an even-number array from an odd-numbered array are provided so that the data read out from the adjacent arrays can be distinguished from each other, whereby each data in each array unit can be accurately read out from one array to another.

EMBODIMENT 9

Figure 13:
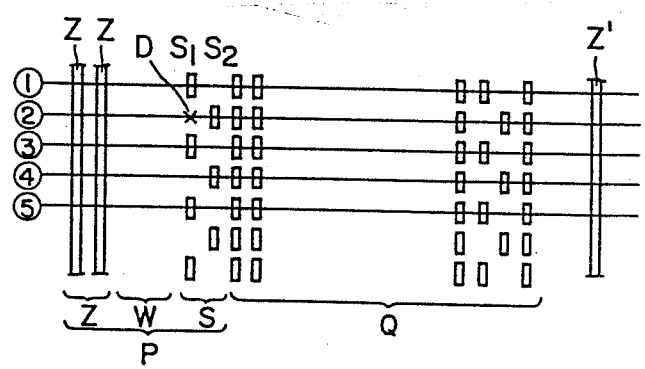
FIG. 13 depicts a recording method in accordance with the present invention which permits the discrimination between the adjacent unit readout arrays.

In the EMBODIMENT 8, the discriminating data pit arrays S each consist of two data pits $S_1$ and $S_2$, but this recording method has a defect that when an error pit occurs, the read operation of not only the array containing such an error pit but also the next array is adversely affected. For instance, assume that the position indicated by X in FIG. 13 is contaminated as indicated by D. As described above, "10" represented by the pits $S_1$ and $S_2$ indicates an odd-numbered array; "01" represented by the pits $S_1$ and $S_2$ indicates an even-numbered array; and any other combination except "10" and "01" indicates an error. After a data readout system has received an odd-numbered array, it receives an even-numbered array. More specifically, the array 1 is discriminated as an odd-numbered array in response to "10" so that the data readout system expects to receive next an even-numbered array represented by "01". However, in the array 2, the contaminated point D represents an error pit so that the pits $S_1$ and $S_2$ represent "11". As a result, the array 2 is processed as an error array and no data is read out. In this case, there arises the problem that the data readout system still expects to receive an even-numbered array represented by "01". That is, when the succeeding array 3 is read out, its pits $S_1$ and $S_2$ represent "10" which indicates that the array 3 is an odd-numbered array. As a result, the array 3 is not read out and the next array 4 is then read out. As described above, the above-described embodiment has an advantage that the discriminating pits consists of only two pits $S_1$ and $S_2$, but has a defect that even when the error pit (D) exists only in the array 2, the next array 3 having any error pit is affected and cannot be read out.

Figure 14:
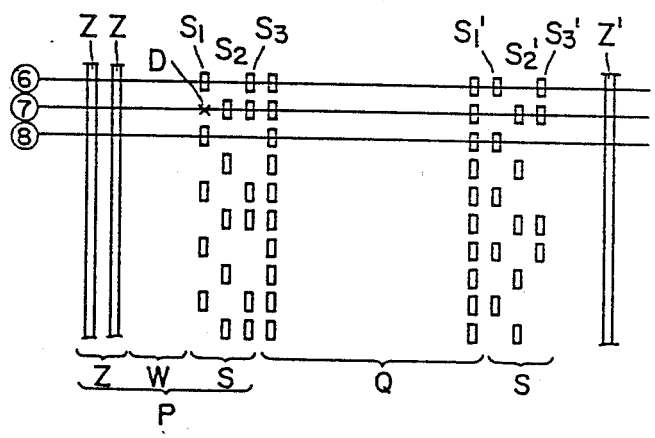
FIG. 14 depicts a recording method in accordance with the present invention which permits the discrimination between the adjacent unit readout arrays.

An embodiment which can solve the above defect is shown in FIG. 14. In this embodiment, the discriminating pits S consist of three pits $S_1$, $S_2$ and $S_3$. First pits $S_1$ of the discriminating pits S alternately becomes "1" and "0" in respective arrays; the second pit $S_2$ alternately becomes "0" and "1" in respective arrays (that is, the second pit $S_2$ is opposite in phase in relation to the first pit $S_1$); and the third pit $S_3$ becomes "1" in two succeeding arrays and becomes '0" in the next two succeeding arrays. As a result, the discriminating data S repeats four patterns "101", "011", "100" and "010" in respective arrays. In other words, an odd-numbered arrays is represented by "101" or "100" while an even-numbered array, by "011" or "010". In addition, in order to further improve the readout accuracy, the discriminating codes S are disposed on both sides of the region Q.

The above-described recording method can reduce the adverse effect caused by an error pit to a minimum. For instance, assume that a contaminated point D exists at a position X in FIG. 14 as an error pit. Then, in response to "101", the array 6 is detected as an odd-numbered array. Therefore a data readout system is so designed and constructed to expect to receive next an even-numbered array or a second category odd-numbered array ("100") In response to "111", the array 7 is detected as an error array and is not read out. Next in response to "100", the array 8 is detected as a second category odd-numbered array and is read out. Thus, the adverse effect in the read operation is limited only to the array 7 and other arrays are read out in a normal manner.

Figure 15:
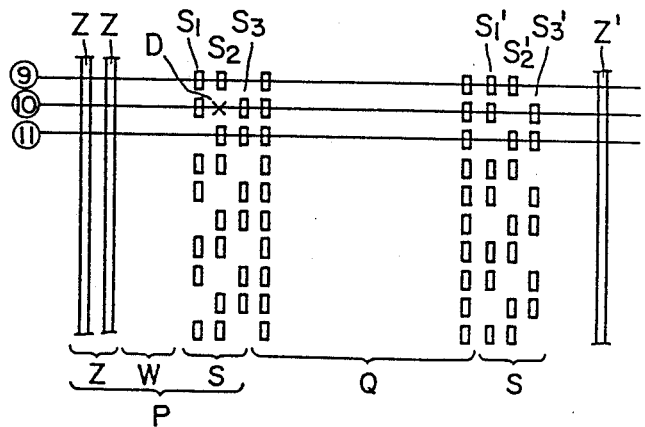
FIG. 15 depicts a recording method in accordance with the present invention which permits the discrimination between the adjacent unit readout arrays.

In an embodiment shown in FIG. 15, each vertical pit array varies "1", "1" and "0" in respective horizontal arrays and the pit repetition is shifted in phase in three vertical arrays. As a result, the discriminating data S repeats three patterns of "110", "101" and "011". The same effects as those obtained by the embodiment described above with reference to FIG. 17 can be obtained when a data readout system is so designed and constructed to receive the data having a next discriminating pattern or a second next discriminating pattern. For instance, even when a contaminated point D exists at a position X in FIG. 15 as an error pit, after the reading of the array 9 having the "110" pattern has been carried out, the data readout system expects to read an array having the pattern "101" or "011" so that after the array 10 has been processed as an error array, the array 11 is read out as the next data.

As described above, according to the embodiments of the present invention, in the optical digital data recording method in which each digital data is recorded as an array unit and the discriminating data for distinguishing the adjacent arrays is provided, the discriminating data can present three or more patterns represented by at least three pits so that the adverse effects caused by the existence of error pits can be reduced to a minimum.

<Recording method capable of taking countermeasure when a read error results>

The length of each pit on an optical data recording card is extremely short and is of the order of tens micrometers so that there is no assurance at all that no readout error results after reading one data storage region. Especially, the optical data recording cards are carried by individual persons, it is expected that the cards tend to be easily contaminated, thus resulting in readout errors at a high frequency. Therefore, a recording method which can take sufficient countermeasure when readout errors result must be employed.

EMBODIMENT 10

FIG. 16 shows only the region Q within the region C shown in FIG. 2; that is, FIG. 16 shows the region from which the desired data is read out, not the region in which are stored the data for controlling the read operation. Each data is recorded in a horizontal array as one unit and a plurality of such horizontal arrays are arranged vertically. The read head 4 has a plurality of read elements arranged in a horizontal array as indicated by the one-dot chain lines and is adapted to read out the data from each array. In case of the embodiment shown in FIG. 16, the read head 4 reads out first the data in the first array; that is, the data A and a. The read head 4 is scanned vertically downwardly so that the data B and b, the data C and c and so on are sequentially read out.

A first feature of this embodiment resides in the fact that each data array comprises n-bit recorded data (recorded in each of the positions indicated by the capital letters of the alphabet) and an m-bit error check data (recorded in each of the positions indicated by the small letters of the alphabet). The data which is required to be stored is recorded only in the n-bit data storage region. The m-bit error check data is formed based on the n-bit data stored in the same array. For instance the data a is prepared based upon the data A. The error check data may be formed by any suitable conventional method. For instance, the data a is represented by the sum of all the bits in the data A.

A second feature of this embodiment resides in the fact that all the data arrays are divided into a plurality of blocks each consisting of l arrays and an error check data is stored in a predetermined array in each block. In case of the example shown in FIG. 16, the arrays are divided into a plurality of blocks each consisting of eight arrays as indicated by the two-dot chain lines. The error check data is stored in the eight array. For instance, the data H is defined based upon the data A-G. The data H may be defined by any suitable conventional method. For instance, the data H may represent the sum of the bits in the data A-G added vertically.

As described above, in each block shown in FIG. 16, the data a-h and H can be used as the error check data so that a readout data can be positively detected and in response to the error check data, an error correction can be performed by a suitable data processing.

As described above, according to this embodiment, in the optical digital data recording method of the type for recording each data in each array unit, the error check data is provided for each data array; a plurality of data arrays is divided into a plurality of blocks; and one array in each block is used for error check. As a result, in case of the read operation, the error check can be carried out in response to these error check data so that the accurate readout can be ensured.

EMBODIMENT 11

In the above-described embodiment, errors can be corrected based on the error check data, but there is a fear that when an optically-stored-data card is greatly damaged and seriously contaminated and when a large readout error occurs, the resulting readout errors cannot be satisfactorily corrected. For instance, when the readout error results from the scanning of the topmost array in FIG. 16, both the data A and a are completely lost. When the readout error of one unit readout array occurs, it becomes impossible to get the trace of the lost data and therefore to correct the data. The optical data recording card has a feature that each readout array is read out one by one by the line sensor so that the probability that the readout error of a whole unit readout array occurs as described above is very high. Furthermore, the vertical direction of the card shown in FIG. 16 is the direction in which the line sensor scans so that the vertical direction is the direction in which the card is most likely damaged. As a result, the error check bits defined in the data H becomes utterly useless to the remedy of such readout error.

Figure 17:
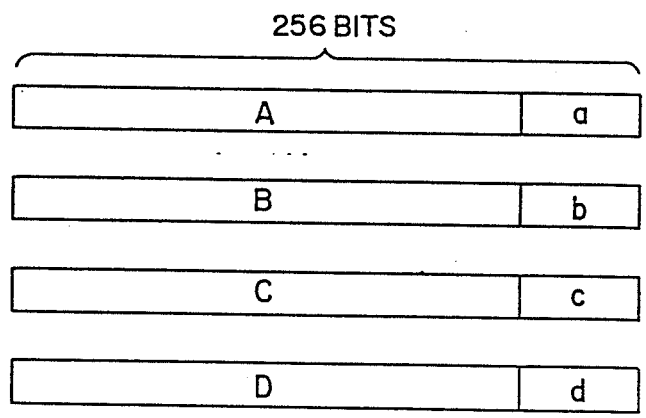
FIG. 17 depicts a recording method in accordance with the present invention which can take countermeasures in case of readout errors.

Therefore, an embodiment in which each unit readout array is divided into a plurality of sections which are distributed for data storage will be described. For instance, assume that four unit readout arrays each consisting of 256 bits including error check data are recorded as shown in FIG. 17. The data A, B, C and D are the data which must be stored and the data a, b, c and d are error check data for respective data arrays. Even a few bits are lost in the data A, the lost bits can be restored by the combination of the normal data A and the whole data a. For instance, assume that the data A consists of 190 bits and the data a consists of 66 bits. Then even when eight bits in the data A are lost, the lost eight bits can be restored by using the remaining 182 bits in the data A and 66 bits in the data a.

Figure 18:
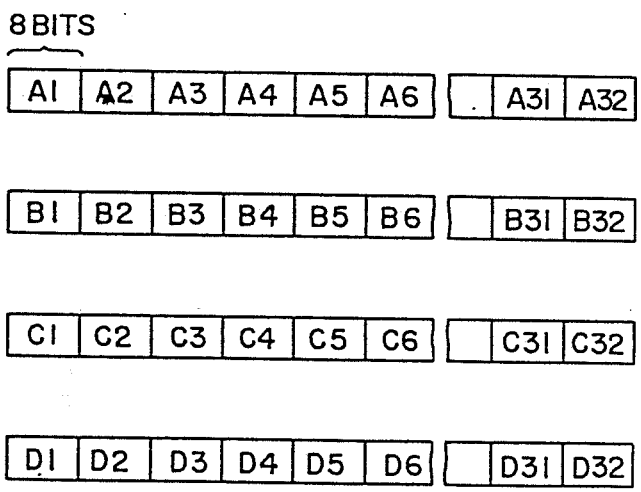
FIG. 18 depicts a recording method in accordance with the present invention which can take countermeasures in case of readout errors.

When the data arrays as shown in FIG. 17 are recorded on an optical data recording card, a recording method similar to that described above with reference to FIG. 16 is obtained. However, this recording method has the above-described problems so that in this embodiment, each data array is divided into a plurality of sections each consisting of 8 bits as shown in FIG. 18. The reason of such division is to restore upto eight bits lost in each array. Therefore, each data array consisting of the data A and data a is divided into a plurality of divided data arrays A1, A2, ... and A32.

Figure 19:
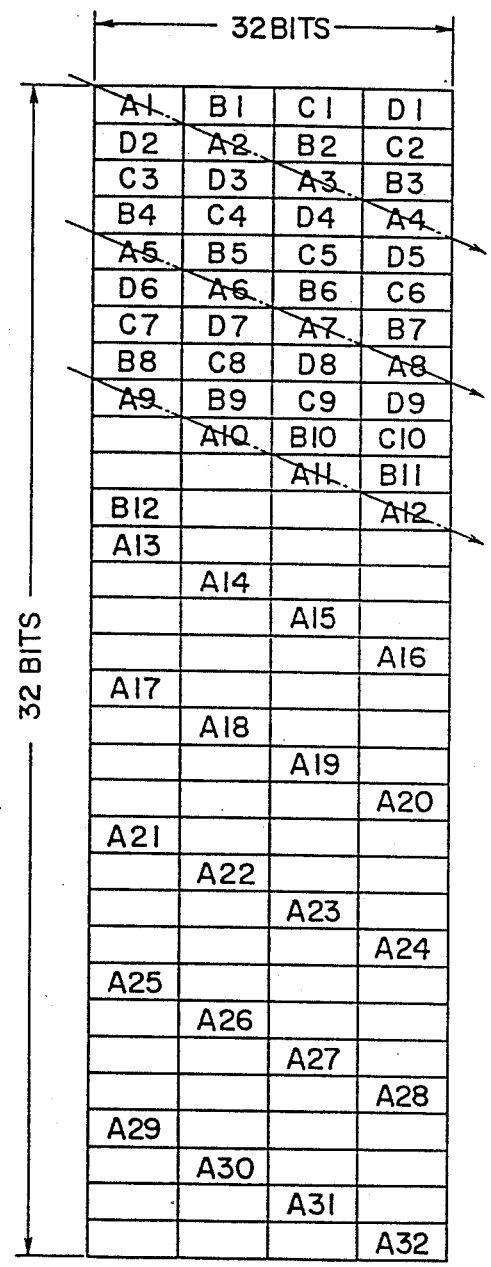
FIG. 19 depicts a recording method in accordance with the present invention which can take countermeasures in case of readout errors.

Next the divided data arrays are arranged as shown in FIG. 19. For instance, the divided data arrays A1, A2, ... and A32 are arranged in an oblique direction as indicated by the one-dot chain lines. Same is true for the divided data arrays B1~B32; C1~C32 and D1~D32. As a result, all the divided data arrays shown in FIG. 18 are arranged in a 32×32-bit matrix and are recorded on an optical data storage card as shown in FIG. 19. That is, the first readout array consists of the divided data arrays A1, B2, C1 and D1; the second unit readout array consists of the divided data arrays D2, A2, B2 and C2; and so on. One of the features of this arrangement resides in the fact that 32 divided data arrays (for instance, A1~A32) of each data array are distributed into respective data arrays and recorded therein. As a result, even when the readout error of the whole unit readout array occurs, the data lost due to this readout error can be restored. For instance, when the readout error occurs along the first unit readout array, all of the divided data arrays A1, B1, C1 and D1 are lost, but the divided data array A1 is restored by the divided data arrays A2~A32; B1, by B2~B32; C1, by C2~C32; and D1, by D2~D32. The recording method as shown in FIG. 19 can take very effective countermeasure against damages such as scratches in the longitudinal direction. For instance, even when a longitudinal damage occurs over the divided data A1, D2, C3 and B4 so that these divided data are lost, since the divided data arrays as shown in FIG. 18 are not arranged in vertical or horizontal arrays, the lost data can be easily restored based upon a vertical or horizontal check sum. In case of the method in which the divided data arrays are distributed and arranged as shown in FIG. 19, the accurate read operation can be ensured even when the card is locally contaminated. For instance, in case of the recording method as shown in FIG. 16, when four unit readout arrays are contaminated, it becomes completely impossible to retrieve the data from these arrays, but in case of the arrangement as shown in FIG. 19, even when the data in four unit readout arrays are lost, it is possible to restore tens percent of the lost data even though it is impossible to restore the lost data 100%. Therefore, there is no fear that the trace of the lost data is completely lost.

As described above, according to this embodiment, each data array is divided into a plurality of divided data arrays which are then distributed and recorded over an optical data recording card, it becomes possible to positively the restoration of data lost due to the readout error.

<Recording method capable of permitting the efficient access to the stored data>

The optical data recording cards have the features that they are read out optically by means of the line sensor and that various data must be stored in each card of a size adapted to be carried out by each person. Therefore, a recording method capable of permitting the access to the stored data is needed. This method will be described in detail hereinafter with reference to some embodiments.

EMBODIMENT 12

Figure 20:
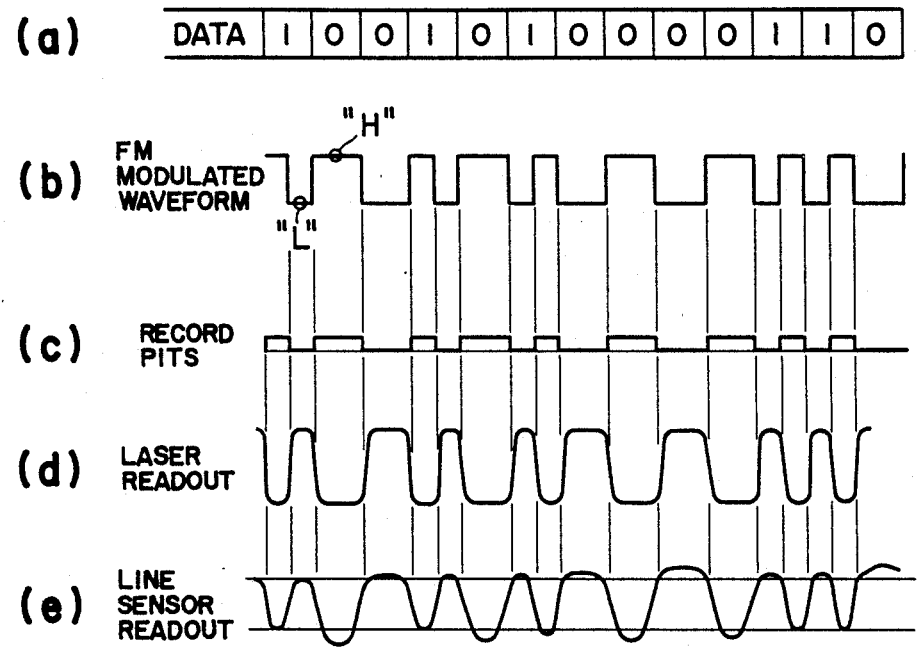
FIGS. 20, (a)–(e), depicts a method of the present invention for forming data pits.

An embodiment of a recording method for recording the digital data as shown in FIG. 20(a) on an optical data storage card will be described. First the digital data is suitably modulated. In this case, the digital data is FM modulated as shown in FIG. 20(b). Next data pits are formed on the surface of an optically recording medium in response to the FM modulated waveform. As shown in FIG. 20(c), the data pits exist at the positions at which the modulated waveform rises to a high level H. Alternatively, a system in which information is represented in the form of a length of each pit is employed. When the pits thus recorded are read out by a laser beam, the readout signal as shown in FIG. 20(d) is obtained.

EMBODIMENT 13

However, in case of the above-described recording method in which information is represented in the form of a length of each pit, the readout signal derived from the line sensor has a waveform as shown in FIG. 20(e) so that the reproducibility of the waveform resulting from the read operation with the leaser beam as shown in FIG. 20(d) cannot be attained. The reason is attributed to a low resolution of the line sensor. It follows therefore, in order to permit the readout by the line sensor, the recording method must be modified.

FIGS. 21(a) and (b) show the digital data and the FM modulated waveform similar to those shown in FIG. 20(a) and (b), respectively. FIG. 21(c) shows pits recorded in accordance with the embodiment 13 and FIG. 21(d) shows the waveform of a readout signal derived from the line sensor.

Figure 21:
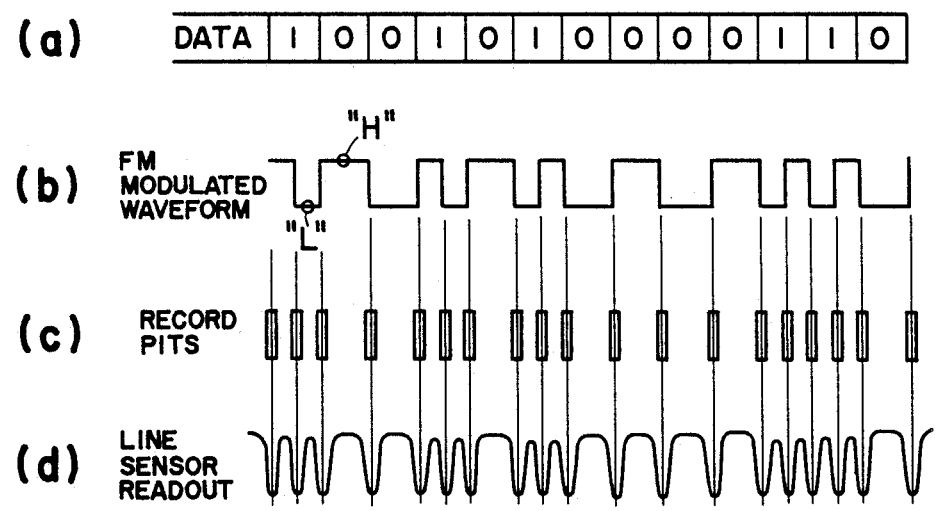
FIG. 21, (a)–(d), depicts a method of the of the present invention for forming data pits.

As is apparent from the comparison between FIG. 21(c) and (b), the bits (pits) are recorded when the FM modulated waveform of the data drops from a high level H to a low level L or rises from a low level L to a high level H. Each pit has a narrow width in the direction of the scanning and is elongated in the direction perpendicular to the scanning direction. That is, each pit is in the form of a rectangle and all the recorded pits have the same size and configuration. The distance between the adjacent pits corresponds to the interval between the adjacent switching points of the data. In FIG. 21, when the distance between the adjacent pits is 1 in relation to the data "1", the distance between the adjacent pits becomes 1 or 2 for the data "0" and will not become longer or shorter than 1 or 2.

As a result, the waveform as shown in FIG. 21(d) is obtained when the pits are detected by the line sensor.

When this waveform is compared with the waveform of the readout signal derived from the line sensor in the recording method in which, as shown in FIG. 20(e), information is represented by the length of a pit, it is observed that the overall level variations of the readout waveforms are significantly different from each other.

The reason is as follows. The line sensor handles charge and the longer a given signal, the higher the level of the readout waveform becomes. Furthermore, the longer the space between the signals, the lower the readout waveform becomes. As a result, due to the combination of variations in the length of the signals with variations in distance between the signals, the level of the readout waveform varies over a wide range in the conventional recording method. On the other hand, according to the present invention, the length of a pit (signal) is maintained at a predetermined value while only the distance between the pits (the space between the signals) varies between a predetermined length and a length twice as long as said predetermined length so that a range of variation in magnitude of charge handled by the line sensor is decreased.

In the waveform shown in FIG. 21(d), the notched portion (or the valley) corresponds to a pit (signal) while the remaining portion (or the ridge) corresponds to the distance between the pits (the space between the signals). The length in the scanning direction of the pit must be selected depending on the resolution of the line sensor so that the notched portions (or valleys) of the waveform can be distinctly defined. Furthermore, the recorded pits must be accurately located at the positions corresponding to the changing points of the modulated waveform of the data.

When the conditions for the recorded pits are satisfied as described above, the recorded data can be accurately reproduced by the detection of the level of the readout waveform by the sensor.

In the above-described embodiment, the data to be recorded has been described as being FM modulated and then recorded, but various modulation systems are available in practice so that in addition to the above-described FM modulation, MFM modulation, PM modulation, NRZ modulation and the like can be used.

As described above, according to this embodiment, the optical digital data recording is carried out in such a way that pits are located at the positions corresponding to the changing points of the modulated waveform of the data to be stored so that the readout signal with less variation in level can be derived by the line sensor having a low degree of resolution. As a result, this embodiment has an advantage that a circuit for processing the output signal from the reading sensor can be made simple in construction.

EMBODIMENT 14

In case of recording the data on an optical data recording card, it is preferable that, as shown in FIG. 1, a plurality of data storage regions 3 are defined and each data is recorded in each data storage region 3. However, when the desired data is merely written into each data storage region, it becomes impossible to detect from which data storage region, the stored data is being read out. It follows that in case of random access to a specific data storage region, the absolute position thereof on the card 1 must be detected so that the read head can be mechanically brought properly at the specific data storage region 3. However, as the data-package density is increased, the position of the read head must be controlled with a higher degree of accuracy, but no means is available for detecting whether or not the reading head is reading the stored data from a desired data storage region.

Therefore it is preferable to use a recording method like this embodiment which can detect from which of a plurality of data storage regions defined on a data recording card, the stored data is being read out.

FIG. 2 is a view used to explain the data stored in the data storage regions 3 of the card shown in FIG. 1(a) by a method of this embodiment. In FIG. 2, each region surrounded by the broken lines represents one data storage region. The position of the optical reading head 4 is indicated by the one-dot chain line. For instance, a line sensor is used as the reading head 4. As described above, the horizontal position of the reading head 4 is determined by reading the positions of two bars Z disposed on the left side in each region. As described above with reference to some embodiments of the present invention, sync pits and pits for discriminating an array are disposed on the right side of the bars Z, but they are not shown for the sake of explanation.

The actual data are stored in the region Q on the right side of the bars Z. In this embodiment, the region Q is divided into five regions A, B, C, B' and A'. The address data which is one of the features of the present invention is recorded in the regions A and A'. As described above, the auxiliary marks used for the correction of the inclination of the reading head 4 are marked in the regions B and B' while the data which one desires to be stored are stored in the region C (some parts of which are not shown in FIG. 2).

The same data are stored in the regions A and A' and each consists of 7 bits in this embodiment. These regions are defined at the leading portion (the region A) and at the trailing portion (the region A') of each data storage region. The data stored in these regions are address data indicating the address of each data storage region. Therefore, when the address data is read out by the reading head 4, the data storage region from which the stored data is being read out can be detected.

In this embodiment, the address data has been described as consisting of a data of 7 bits whose states are defined by the presence and absence of bars, but a method for representing an address data in terms of the distance between the adjacent bars may be used. Furthermore, the storage of the address data is not limited to the leading and trailing portions of each data storage region and may be made at any suitable portion as far as the address data can be detected.

As described above, according to this embodiment, in the optical data recording method for recording the optical digital data on an optical data storage card having a plurality of data storage regions, the address data for discriminating each data storage region are recorded at predetermined portions of each data storage region so that it becomes possible to detect from which data storage region the stored data is being read out.

EMBODIMENT 15

The recording method of the above-described embodiment has the capability of discriminating the address of each data storage region, but has the problem that the category of the data stored in each data storage region cannot be detected. That is, the data to be stored may be simple binary data representing letters, images and so on or may be a program data indicating a processing sequence. Furthermore, the program data can be written in various program languages. Thus, when the category of the read out data cannot be detected, the smooth processing after the read operation becomes impossible.

In addition, according to the recording method of the type described above, the total number of data in a certain data storage region cannot be obtained without counting each data stored. Furthermore, in case of readout, it is not known to store the readout data into which address in the reading device so that it sometimes is required to transfer a predetermined address data after readout. Moreover, in case of executing the program after readout, it is impossible to detect where the start address exists. In some cases, the readout data must be transferred into an external storage device depending upon a kind of the readout data. But no information is available for transferring the readout data into which address of the exterior storage device and for starting the execution of the program from which address.

In view of the above, in case of an optical data recording card having a plurality of data storage regions, it is preferable to use a recording method which can permit the smooth processing of the readout data.

To this end, information concerning the data stored in the region C as well as the data address may be recorded in the region A or A' in the same data storage region. Information which must be recorded are as follows:

(1) The total number of data stored in the region C;

(2) The loading address value of the data in the region C and the start address value of the program;

(3) The address value of the external memory to which is transferred the data read out from the region C and the start address value of the program in the external memory;

(4) Information which can detect whether the data stored in the region C is a simple binary data representing a letter train or image data or a program data containing a series of instructions for performing a processing sequence; and (5) When the data stored in the region C is a program data, information concerning a kind of the language (machine language, BASIC, FORTRAN and so on) used to prepare said program data and information concerning a recording method (an intermediate language code, ASCII code) used for recording said information.

When various information described above is recorded in the regions A and A', the above-described problems can be substantially overcome so that the data processing after read out can be carried out smoothly.

The above-described information may be recorded in any suitable portion of each data storage region, but it is more preferable that it is recorded in the region A in FIG. 2. Since the reading head 4 scans vertically downwardly the data arrays in the data storage region 3-1, it reads out first the data stored in the region A so that the stored data read out from the region C can be processed smoothly based upon the data read out from the first region A.

As described above, according to this embodiment, in the recording method of the type for recording the optical digital data on an optical data recording card having a plurality of data storage regions, a region into which is stored information concerning the data stored in each data storage region is provided for each data storage region so that the data processing after readout can be carried out smoothly.

<Optical data reading device>

One example of optical data reading devices adapted for reading out the stored optical data from the optical data recording cards on which are recorded the data in accordance with the present invention will be briefly described hereinafter. As described above, the data stored on the card is scanned and read out by the line sensor and there exists some interdependence between the optical data recording cards and the line sensor used to read out the data stored thereon. That is, as many data as possible must be recorded on each card so that it is required to record small pits at a high density. On the other hand, in order to reduce the readout errors to a minimum, the pits on the card preferably have a size suitably corresponding to the size of a pixel of the line sensor. In order to balance the demand for the cards from the standpoint of the data packaging density with the demand of the line sensor for the cards, an optical system or lens is disposed at the light incidence portion of the line sensor.

However, in case of the read operation, the distances between the elements in the optical system including the card and the line sensor vary due to vibration of the card caused by, for instance, the defects of a card supporting mechanism, so that in some cases, the recorded pits on the card are displaced out of the operation range of the optical system to, for instance, a portion at which the beam from the optical system is not focused. However, so far no satisfactory studies and experiments have been conducted in order to remedy such defect. As a result, no optical card read device which can be satisfactorily used in practice has been proposed yet.

In view of the above, the device to be described below was designed and constructed so that the data stored on the optical data cards can be read out at a high reading almost without readout errors.

Figure 22:
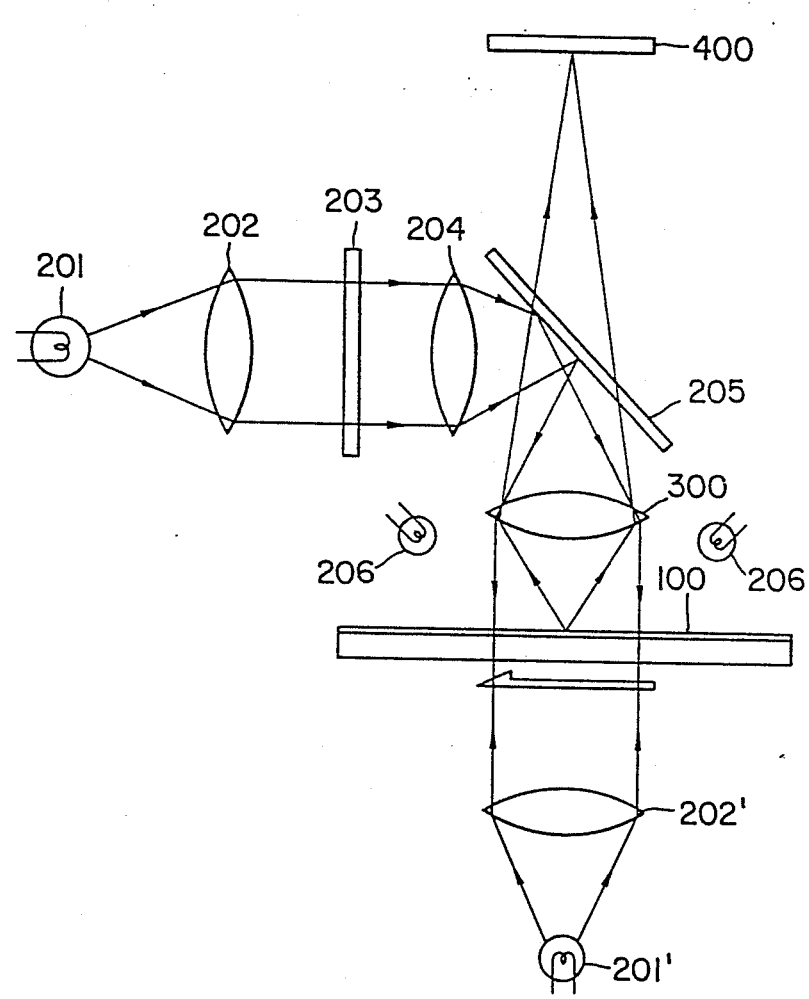
FIG. 22 shows an optical system of a read device for reading out an optical data recording card on which the data are stored by the method in accordance with the present invention.

FIG. 22 shows an optical system of the device of the type described above. In this system, a light beam emitted from a light source 201 (such as a tungsten lamp, a LED, a laser or the like) is directed through a lens 202, a diffuser 203 and another lens 204 to a half-mirror 205 and the light beam reflected from the half-mirror 205 is focused through an objective lens 300 on the recording surface of an optical card 100 so that the pits in the recording surface of the optical card 100 are projected on a line sensor 400. In case of a transparent optical card 100, a light source 201' and a lens 202' are used. An auxiliary light source 206 is disposed upwardly obliquely of the optical card 100.

In this optical system, even when the relative distance between the line sensor 400 and the optical card 100 is varied, no focal point adjustment is needed because the magnification of the objective lens 300 is reduced as practically as possible so as to increase the depth of focus thereof. As a result, it is not needed to design and construct the optical reading device in such a way that the relative distance between the card 100 and the line sensor 400 is strictly maintained, whereby the system can be simplified.

The objective lens 300 has a large aperture so that the adverse effects caused by scratches and dust particles on a transparent protective layer covering the recording surface of the card 100 can be avoided.

The objective lens 300 must have a sufficiently high degree of resolution in relation to the size of the recorded pits.

The depth of focus $\Delta$ is given by $$\Delta = \frac{\lambda}{NA^2} + \frac{1}{7m \times NA} \text{ [mm]}$$

where
NA is a numerical aperture;
$\alpha$ is a resolution;
$\lambda$ is a reading wavelength; and
m is a magnification.
And the resolution $\alpha$ is given by $$\alpha = \frac{0.61\lambda}{NA}.$$

Substituting $\Delta=40$ micrometers, $\alpha=1$ micrometer, and $\lambda=0.67$ micrometers into the above equations, we obtain NA=0.40, and m=10

The above-described values mean that even when the relative distance between the optical card 100 and the line sensor 400 varies by 40 micrometers, the pits greater than one micrometer can be accurately read out. With these margins, there can be provided a practically satisfactory reader at a relatively low fabrication cost.

The reason why the optical system as shown in FIG. 22 is provided with the auxiliary light source 206 is as follows.

Figure 23:
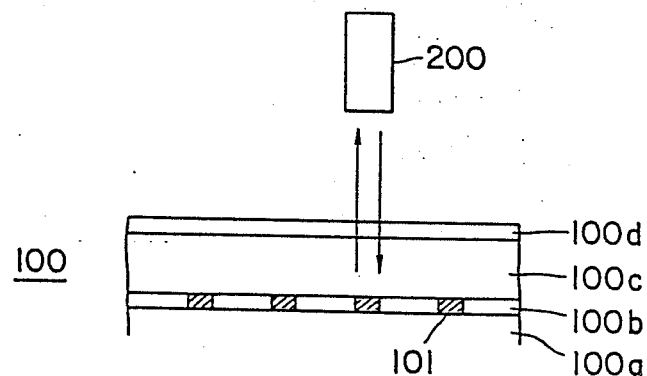
FIG. 23 depicts the function of an auxiliary light source in the optical system shown in FIG. 22.

FIG. 23 shows a readout method with a conventional data reading device. The card 100 comprises a base or substrate 100a, a data recording layer 100b, a cover sheet layer 100c and a protective layer 100d. The data are recorded in the data recording layer 100b in the form of data pits 101. A reading head 200 is disposed above the card 100. The reading head 200 has a light source for emitting a light beam to the card 100 and a light receiving device for receiving the light beam reflected from the card 100 in the direction opposite to the direction in which the light beam emitted from the light source impinges on the card 100. The emitted light beam is focused on the data recording layer 100b and the light receiving device such as a line sensor can read out the data pit 101 from the reflected light beam. When the line sensor is used, tens or hundreds of data pits arranged in an array in the direction of the array of elements can be read out simultaneously.

Figure 24:
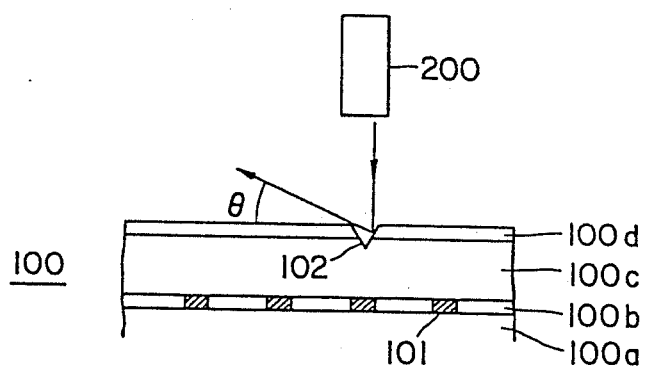
FIG. 24 depicts the function of an auxiliary light source in the optical system shown in FIG. 22.

In general, the cards are carried by individual persons so that their recording surfaces tend to be scratched and contaminated. In case of the magnetic cards, the readout is not adversely affected by the existence of such scratches and contaminants, but in case of the optical data recording cards, such scratches and contaminants cause serious problems. For instance, assume that a scratch 102 is formed at the surface of the card 100 as shown in FIG. 24. Then the light beam emitted from the light source 200 is scattered at the scratch 102 and is reflected at an angle $\theta$ in relation to the data recording surface of the card. Therefore when the light beam reflected by the scratch 102 impinges on the line sensor in the reading head 200, the output signal whose magnitude is substantially equal to the magnitude of the readout signal obtained by reading the data pit 101 tends to appear in some cases. It is extremely difficult to remove such readout error due to the scratch 102 by an electric signal processing succeeding the data read out.

In order to avoid such scratch, the protective film 100d is provided, but the perfect protection cannot be expected so that the occurrence of some scratches is unavoidable. Furthermore, fine gas bubbles and other defects in the cover sheet cause the readout errors in a manner substantially similar to that described above.

Figure 25:
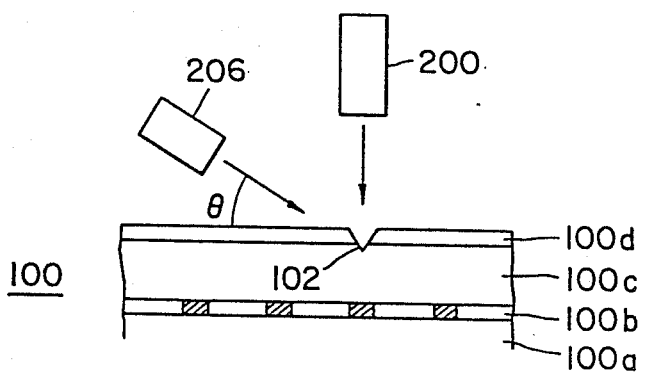
FIG. 25 depicts the function of an auxiliary light source in the optical system shown in FIG. 22.

In view of the above, in the reading device there are provided a main light source for emitting the main light beam which impinges on the card at a predetermined angle of incidence, an auxiliary light source for emitting the auxiliary light beam in the direction in which the adverse effects caused by the scattering of the main light beam due to a defect on the card can be compensated for, and a light receiving device adapted to receive the light beam directly reflected from the card, thereby reading the data, whereby the readout errors due to various defects on the card can be reduced to a minimum. Thus, as shown in FIG. 25, an auxiliary light source 206 is provided.

It is preferable that the auxiliary light source 206 is disposed in the direction in which the main light beam tends to be scattered by the scratch 102. For instance, when the main light beam is scattered at the angle $\theta$ as shown in FIG. 24, it suffices to dispose the auxiliary light source 206 in the same direction as indicated by the angle $\theta$ in FIG. 25. When the main light beam is scattered when no auxiliary light source 206 is provided, the light beam reflected does not return to the reading head and becomes dark. However, when the auxiliary light source 206 is provided, the auxiliary light beam emitted therefrom is scattered upwardly, thereby compensating for the adverse effect caused by the scattering. Furthermore, even when the scratch 102 is formed immediately above the data pit 101, light illumination to the hidden data pit can be compensated for by the auxiliary light beam.

As to the angle of incidence of the auxiliary beam, an optimum position varies depending upon the depth and angle of a scratch formed on the card and upon the sizes and positions of other defects, but it is effective that the auxiliary light beam is made to impinge on the data recording surface at an angle between 5° and 60°. When the auxiliary light sources are disposed in such a way that the auxiliary light beams may be distributed uniformly to some extent in the angular region between 5°-60°, the effective mutual cooperation between the main and auxiliary light beams can be attained to reduce the adverse effects resulting from the defects over the card so that the readout errors can be significantly minimized.

Referring back to FIG. 22, the output signal derived from the line sensor 400 can be processed by a conventional signal processing circuit. FIG. 26 shows in block diagram a conventional signal processing circuit. First, the data pits arranged in one array on the optical data recording card are read out by a line sensor 501. The output from the line sensor is amplified by an preamplifier 502 and is made to pass through a low-pass filter 503, whereby the high frequency component is cut off. The output signal from the filter 503 is applied to a comparator 504. For instance, the data pits are arranged as shown in FIG. 27(a), the signal S(Q) as shown in FIG. 27(b) is applied to the comparator 504. The comparator 504 compares the level of the signal S(Q) with a predetermined reference value S(R) and delivers the result in the form of binary signals as shown in FIG. 27(c). The binary signals S(S) are processed as the readout signal of the data pit array or train shown in FIG. 27(a).

However, the binary signals S(S) have the problems that the pulse duration varies from one puse to another and that the center position of each pulse does not necessarily coincide with the analog output signal from the line sensor (that is, the peak position of the signal S(Q) shown in FIG. 27(b)). The reason is that the peak of the signal S(Q) corresponding to each data pit does not become uniform because of the inherent characteristic of each picture elements which constitute the line sensor so that each peak includes a variation component more or less. As a result, the correct position of the data pit cannot be detected from the binary signal S(S) and furthermore since the pulse duration is not uniform, the signal processing succeeding to the readout operation is adversely affected.

Therefore, it is preferable to use a signal processing circuit having the construction as shown in FIG. 28. A CCD line sensor 501, a preamplifier 502, a low-pass filter 503 and a comparator 504 are similar to those described above with reference to FIG. 26 so that no further explanation thereof shall not be made here. In this device, the output signal from the low-pass filter 503 is applied not only to the comparator 504 but also to a peak detector 506. The binary signal derived from the comparator 504 and the binary signal delivered from the peak detector 506 are applied to an AND gate 507 to obtain a logical product. The logical product signal is applied to a one-shot multivibrator 508 so that a binary coded output signal 505 having a predetermined pulse duration can be obtained.

Figure 29:
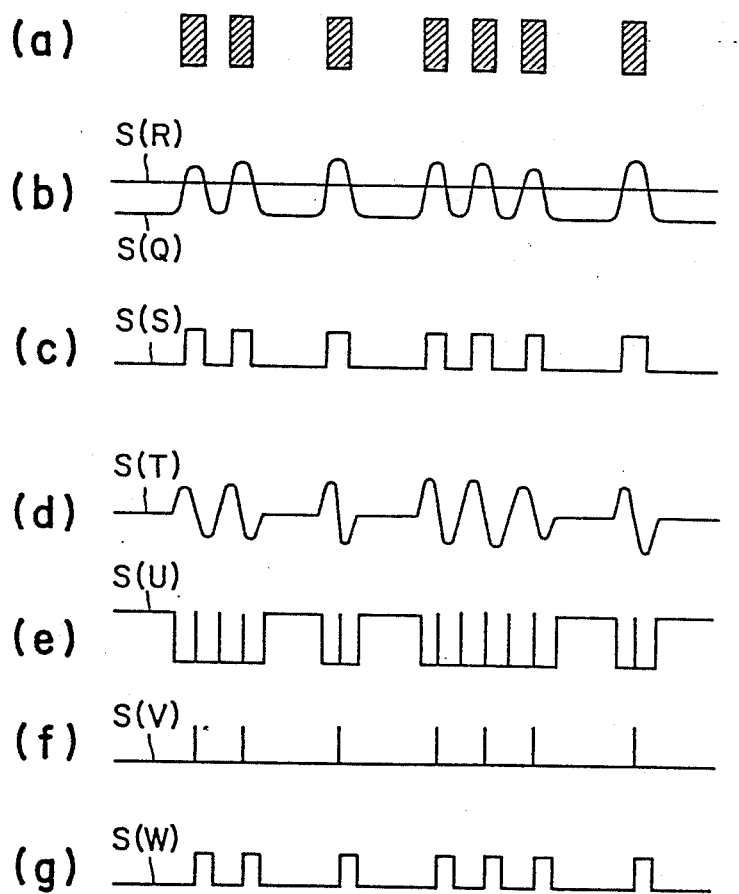
FIG. 29, (a)–(g), depicts the mode of operation of the signal processing system shown in FIG. 28.

Referring further to FIG. 29, the mode of operation of the device will be described. Assume that the data pits are arranged in one array as shown in FIG. 29(a). Then, the signal S(Q) as shown in FIG. 29(b) is derived as an analog output signal from the low-pass filter 503. As described above, the comparator 504 compares the level of the signal S(Q) with a predetermined reference value S(R) and delivers the result in the form of a binary signal shown in FIG. 29(c). As described above, the binary signal S(S) has the same problems that it cannot detect the correct position of a data pit and that it has no predetermined pulse duration.

In this device, the signal S(Q) is applied to the peak detector 506. The peak detector 506 has a function of detecting the peak position of the signal S(Q) and may be constructed by, for instance, a differentiating circuit. That is, the signal S(Q) is differentiated as shown in FIG. 29(d) to obtain a differentiated signal S(T). Next as shown in FIG. 29(e), the zero level of the differentiated signal S(T) is detected, thereby obtaining a peak-detection signal S(U). The peak-detection signal S(T) becomes the binary output signal from the peak detector 506 and the high-level position corresponds to the peak position of the signal S(Q) (including both the maximum and minimum peaks).

Next the AND gate 507 obtains the logical product of the signal S(S) and the signal S(U). When the logical product is obtained, it becomes possible to eliminate the pulses corresponding to the minimum peaks contained in the signal S(U) and also the pulses corresponding to the peaks of the noise components appearing between the data pits. As a result, the signal S(V) as shown in FIG. 29(f) is obtained as the output signal from the AND gate 507. Finally, the signal S(V) thus obtained is applied to a pulse generator so as to produce the pulses which are synchronized with the signal S(V) and have a predetermined pulse duration. In this embodiment, the one-shot multivibrator 508 is used as the pulse generator. In response to the signal S(V) pulse, the one-shot multivibrator 508 is triggered so that the final readout signal S(W) is obtained as shown in FIG. 29(g). The signal S(W) has a predetermined pulse duration and is synchronized with the analog signal S(Q) so that the positions of the data pits can be detected with a high degree of accuracy.

Figure 30:
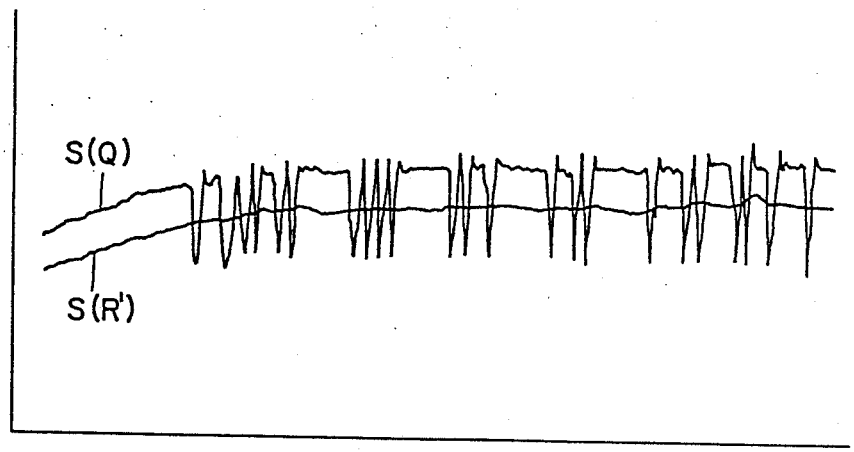
FIG. 30 depicts the mode of operation of the signal processing system shown in FIG. 28.

In the embodiment described in FIG. 28, the reference value applied to the comparator 504 has not a predetermined value S(R) as shown in FIG. 29(b), but is a signal S(R') produced by a shading complementary circuit 509 in response to the predetermined value S(R). The reason of this is explaind as follows. In practice, the analog signal S(Q) is such as the signal S(Q) shown in FIG. 30 (Since the signal data was obtained by the actual measurement, it has a polarity opposite to that of the signals shown in FIG. 29). Since the characteristics of the optical system is affected due to the shading effect resulting from the contamination or the like of the optical data recording card, the base level itself gently varies. As a result, it is preferable that the reference value input applied to the comparator 504 is the signal S(R') which varies in response to the above-described variation.

As described above, according to this device, the optical digital data reading device comprises a comparator for comparing the output signal from a line sensor with a predetermined reference value, a peak detector for detecting the peaks of the output signal from the line sensor and an AND gate for obtaining a logical product of the output signals from the comparator and the peak detector, whereby in response to the output signal from the AND gate the readout signal is produced. Therefore, the positions of the data pits to be read out can be detected with a high degree of accuracy and furthermore the readout signal having a predetermined pulse duration can be obtained.

<Optical data reading method>

As described above, the data to be recorded in the form of existence and absence of data pits repeated at a predetermined period. The period is previously determined when the data is recorded and in case of the readout, the stored data pits are read out at the same period as that used in the recording process.

However, in practice, in case of the readout operation, there exists the problem that the period of pits actually recorded is deviated from the reading period. Various causes may be attributed to this problem. For instance, the pit intervals vary due to the deflection and expansion of an optical recording card which is a recording medium. In this case, the pit distance varies from one card to another depending upon the materials of the optical recording cards and the storage conditions thereof. Furthermore, it may be considered that even in one card, the pit distance on the left data storage region 3 becomes different from that on the right storage region 3. Another cause may be due to the characteristics of the optical system in case of the readout operation. When a focused image is distorted due to aberrations of lenses, the line sensor detects the difference in pit distance even in a single unit readout array. When the optical recording card is deflected, the focal point is deviated so that the difference in pit distance is recognized.

In addition, the deviation of a readout period is caused in some cases due to the latent errors of clocks which define a readout period in the readout system. In general, clocks are reset every time when each pit is read out, but when the data "0" continues for some periods; that is, when the no-pit state lasts for some period or when a dust particle is attached, thereby forming a contaminated point in a pit array, clocks are reset in response to this contaminated point so that there is a danger that the readout period is completely deviated.

Figure 31:
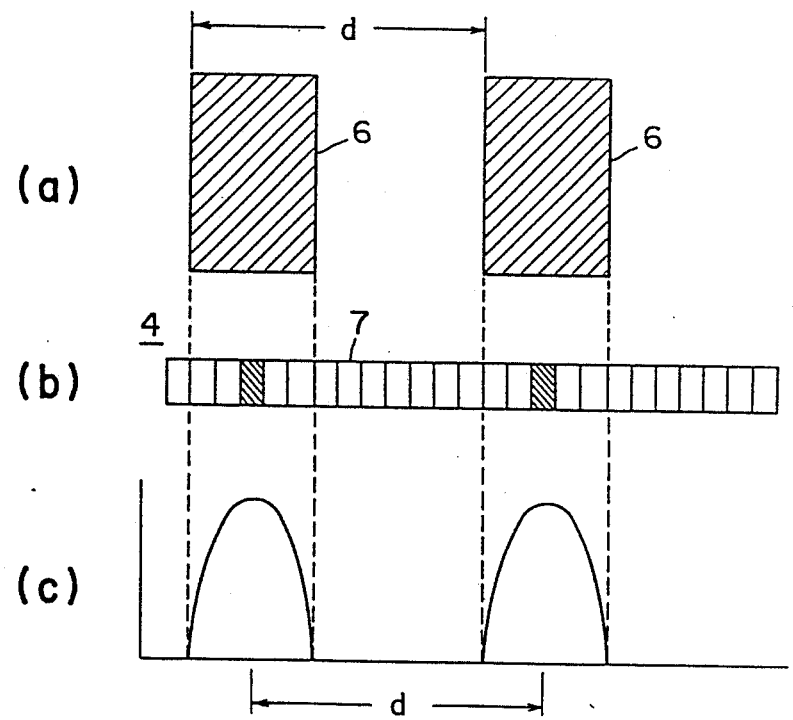
FIG. 31, (a)–(c), depicts one example of the preferable method for reading out the data stored on an optical data recording card by the method in accordance with the present invention.

In view of the above, it is preferable to use the following readout method. FIG. 31 is a view used to explain such readout method. FIG. 31(a) shows, on enlarged scale, pits in the data storage region; FIG. 31(b) shows, on enlarged scale, a line sensor used in the readout operation; and FIG. 31(c) shows the waveform of the readout signal derived from the line sensor. As shown in FIG. 31(a), the data is recorded in the form of pits 6 spaced apart from each other by a predetermined period d. However, it is apparent that some pits 6 do not exist at a predetermined period d and the presence and absence of the pits 6 is dependent upon the data to be stored. The pits 6 are arranged in a horizontal array in FIG. 31 and picture elements 7 which constitute the line sensor 4 are arranged in a horizontal array as shown in FIG. 31(b). In practice, the pit 6 is enlarged through an optical system and then read out by the line sensor 4 so that in case of the comparison among the FIGS. 31(a), (b) and (c), it may be considered that the pits 6 shown in FIG. 31(a) is enlarged in size by the optical systgem.

Meanwhile, according to a conventional readout method, the output waveform obtained from all the picture elements of the line sensor 4 as shown in FIG. 31(c) is scanned at a period d, but, as described above, the period of the peaks in the output waveform is deviated from the period d. Therefore, this problem can be substantially solved by not using the output signals from all the picture elements of the line sensor 4, but by reading the data only in response to the output signals from the specific picture elements each having a one-to-one correspondence with each pit 6. For instance, assume that a number of n pits are arranged in an array and read out by a line sensor in which a number of m (m is greater than n) picture elements are arranged in an array. Then prior to the readout operation, the number of n picture elements are selected from the number of m picture elements In the example shown in FIG. 31, two pits are arranged and the line sensor consists of 25 picture elements. Therefore, of 25 picture elements, two picture elements (hatched) each having one-to-one correspondence with each pit are selected and the data is read out only in response to the output signals from these selected picture elements. When the picture elements corresponding to the peaks of the waveform shown in FIG. 31(c) are selected, each data pit can be readout at an optimum readout position.

Figure 32:
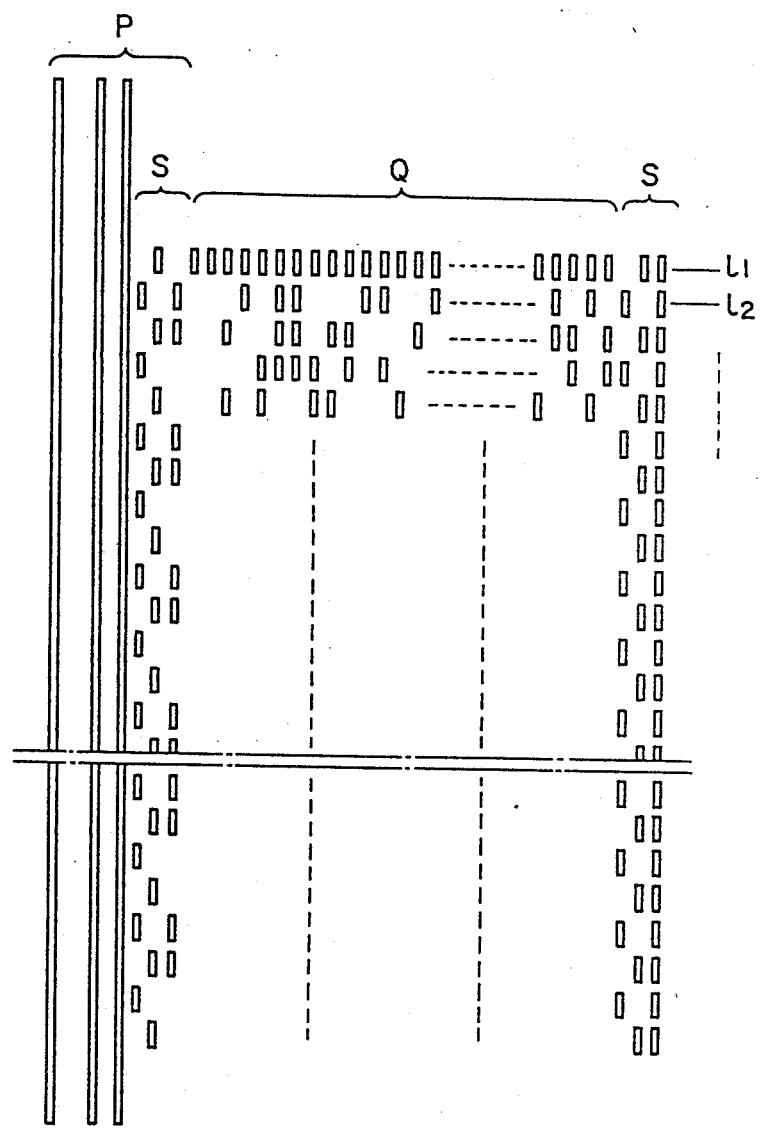
FIG. 32 depicts one example of the preferable method for reading out the data stored on an optical data recording card by the method in accordance with the present invention.

To this end, the following methods are used. According to a first method, a reference data pit is previously formed on a recording medium to be read out and the picture element selection is carried out in response to the readout signal from this reference data pit. For instance, as shown in FIG. 32, the reference data are recorded in such a way that one pit always exists during each period in the first array $l_1$. The data which must be actually recorded are recorded in the second array $l_2$ and the arrays succeeding thereto. When the reference data in the first array $l_1$ are read out, the picture elements each corresponding to each peak position of the output waveform shown in FIG. 31(c) can be easily selected. In case of the optical recording card shown in FIG. 1(a), when the reference data is stored at the upper portion of each data storage region 3, the readout operation can be accomplished at the optimum readout positions for respective data storage regions even when the pit period varies from one data storage region to another due to the deflection of the card or the distortions of the optical system.

Another selection method is such that the data concerning to the picture elements to be selected are previously registered on a recording medium to be read out. In case of optical recording cards made of the same material and having the same pattern, it may be considered that they have a common feature with regard to the data pit positions. It follows therefore that when the picture elements to be selected in case of readout of optical recording cards having some common features are previously registered, the selection can be made even when no reference data are recorded in each optical recording card.

According to the readout method described above, prior to the readout operation, there is established one-to-one correspondence between the position of each data pit and a picture element of the reading line sensor so that the data pit is read out by the corresponding picture element so that all the data pits can be read out at the optimum readout positions.

INDUSTRIAL APPLICABILITY

In order to suggest the industrial applicability of the optical data recording cards in accordance with the present invention, some of their applications will be described. However, the applications to be described above are only typical examples and it is to be understood that they may be applied in various fields in various manners.

(1) Uses of recording media of computer programs:

At present, magnetic disks and a floppy disks have been widely used as recording media for storage of the computer programs. Furthermore, IC cards have been devised and demonstrated recently. However, it should be noted that the optical data storage cards have a data-packaging density about 25,000 times as high as that of the magnetic cards and about 250 times as high as that of the IC cards (at present, the capacity of each card is about 400K bits) so that the optical data recording cards may be considered to be the recording media capable of attaining the highest data-packaging density. In addition, unlike the magnetic recording media whose stored data are destroyed by the electromagnetic phenomena, the optical data recording cards have not such defects. Furthermore, when compared with the IC cards, the optical data recording cards have the advantage that their functions will not be adversely affected at all even they are folded or due to the electrostatic effects. Moreover, they are convenient to be carried out and the possibility that the optical data recording cards are used as recording media for personal computers and the like is very high.

(2) Uses as media for recording images:

As described above, the optical data recording cards has an extremely high data-packaging density, they are best suited for used as recording media for recording image or pattern information. It is possible to store all image or pattern information such as picture books, design drafts, maps and so on. Furthermore, they can advantageously applied to the videotech systems which have been recently developed and come into wide use.

(3) Uses as media for storage of various data base:

The optical data recording cards are best suited to be used as media for recording data base. For instance, they may be used as media for storage of all information such as commercial catalogs distributed in exhibitions or fairs, data concerning stock prices and bonds, publication catalogs, data concerning periodicals, judicial precedents and so on.

(4) Uses as media for storage of musical data:

When a music is recorded on an optical data recording card, the latter can be used as a music medium instead of cassette tapes and compact disks which are widely used at present. Since information is optically and digitally recorded, the recorded music can be reproduced with a high degree of quality. Furthermore, in case of the reproduction of music, its test, composer and other addition information can be displayed on a display device.

When audio data are recorded instead of music, it becomes possible to use them as a data base.

(5) Other personal uses:

1. Telephone guides: The optical data recording cards may be used as telephone guides in which desired telephone numbers in in-company private automatic branch exchange systems, telephone numbers of restaurants and so on. Especially, in case of an in-company telephone exchange system, when the telephone sets and an computer are interconnected with each other, the telephone guide can realize the automatic dialing system into which is inserted an optical data recording card.

2. Dictionaries: At present, the data storage capacity of each optical data recording card is about 400 K bytes, but it may be used as a dictionary of a foreign language studied at the level of a junior high school.

3. Cooking cards: It is possible to record the data concerning materials and cooking methods of respective menues on an optical data recording card. When not only the word data but also the audio data, the optical data recording cards become more effective in use. In addition, an automatic cooking system can be realized when the optical data recording cards are combined with an electronic range incorporating therein a microcomputer.

4. Golf course guides: Various guide data for each of 18 holes in a golf course are stored on the optical data recording cards and the cards are distributed to the golf players in golf club houses. Then, while the players are waiting for their turn, they can study their golf playing plans referring to the guide data.

5. Navigator maps for automobiles: The drivers can use within their cars the optical data recording cards on which are recorded the data such as road maps and so on. when a readout or reproduction device is disposed in a dash-board and when a driver inserts a card into it, a desired map may be displayed.

6. The optical data recording cards may be used as cards on which are recorded authentic records of celebrated chess or go games. A user may buy a chess or go record guide of a celebrated chess or go game that he/she prefers and inserts it into a readout or reproduction device so that the chess or go record may be reproduced on a display device. Furthermore, the optical data recording cards recording a chess or go training program may be put on the market.

7. Correspondence course cards: It is possible to record various instruction data in correspondence courses such as various data concerning gardening (such as seeding, transplantation, pruning and so on) on the optical data recording cards to be sent every month to specific users. Since the optical data recording cards can withstand against folding and will not be adversely influenced by the magnetic effects, they are particularly suitable for mailing.

We claim:

1. A data recording method for recording data on an optical data recording card having a plurality of data arrays, wherein a pit for indicating the center line position of a data array is added at either end of said data array and at least two parallel bars which serve as a guide in case of reading the data arrays are extended in a vicinity of one of the ends of said data arrays in a direction perpendicular to said data arrays, said pit being located between said bars and said data arrays and a distance between said bars and said pit being set to a predetermined constant, the length of said pit indicating the center line position being shorter than those of pits constituting each data array.

2. The data recording method of claim 1, wherein said pit indicating the center line position is a circular pit, the center of which coincides with said center line.

* * * * *